United States Patent [19]

Tokura et al.

[11] Patent Number: 5,400,329
[45] Date of Patent: Mar. 21, 1995

[54] PACKET NETWORK AND METHOD FOR CONGESTION AVOIDANCE IN PACKET NETWORKS

[75] Inventors: Nobuyuki Tokura, Yokosuka; Yoshio Kajiyama, Yokohama; Hideo Tatsuno, Yokosuka, all of Japan

[73] Assignee: Nippon Telegraph & Telephone Corporation, Tokyo, Japan

[21] Appl. No.: 51,900

[22] Filed: Apr. 27, 1993

[30] Foreign Application Priority Data

| Apr. 27, 1992 | [JP] | Japan | 4-107869 |
| Aug. 12, 1992 | [JP] | Japan | 4-215310 |
| Nov. 26, 1992 | [JP] | Japan | 4-317256 |

[51] Int. Cl.⁶ ............................................. H04J 3/16
[52] U.S. Cl. .................................. 370/84; 370/17; 370/60; 370/79; 370/94.1
[58] Field of Search ................ 370/17, 60, 79, 84, 370/94.1

[56] References Cited

U.S. PATENT DOCUMENTS

| 4,769,811 | 9/1988 | Eckberg, Jr. et al. | 370/60 |
| 4,896,316 | 1/1990 | Lespagnol et al. | 370/60 |
| 5,014,265 | 5/1991 | Hahne et al. | 370/60 |
| 5,042,027 | 8/1991 | Takase et al. | 370/60 X |
| 5,193,151 | 3/1993 | Jain | 370/60 X |

*Primary Examiner*—Douglas W. Olms
*Assistant Examiner*—Russell W. Blum
*Attorney, Agent, or Firm*—Cushman, Darby & Cushman

[57] ABSTRACT

Packet transfer is controlled by using an acceleration rate of packet transfers or by using a packet transfer rate acceleration ratio to predict that congestion will occur at a prescribed time in the future. Congestion avoidance in packet integrated networks is thereby achieved in a network having both variable rate terminal nodes and fixed rate terminal nodes. A future packet transfer rate is predicted in a congestion prediction circuit on the basis of a pre-established upper limit for the packet transfer acceleration or acceleration ratio. When it is predicted that the packet transfer rate will exceed a permissible value, a congestion prediction signal is output or a rate increase request indication is deleted. The invention prevents packets from being discarded in the packet network, allows buffer memory capacity of nodes in the network to be decreased, and avoids the generation of new packets when signal congestion is predicted.

62 Claims, 18 Drawing Sheets

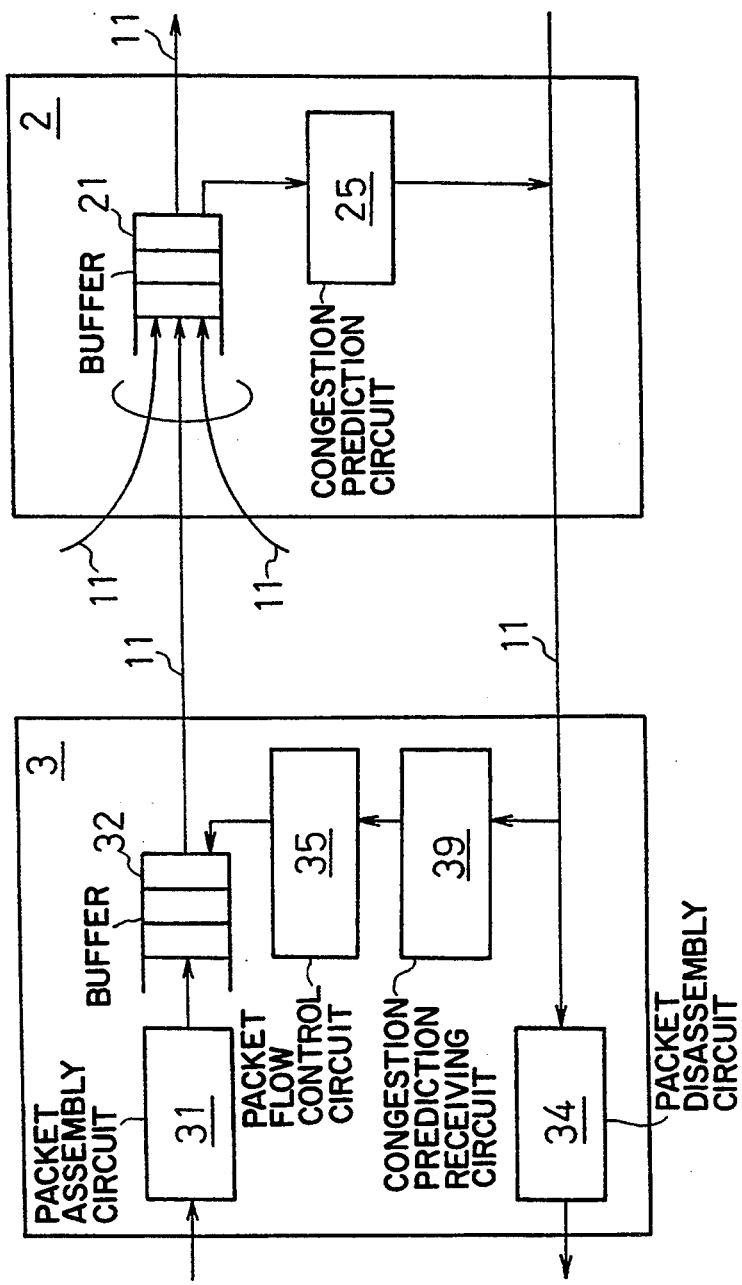
F I G. 5

| transmit or not | 1 | 0 | 0 | 0 | 0 | 0 | 1 | --- | 1 | 0 | 0 | 1 | 0 | 1 |
|---|---|---|---|---|---|---|---|---|---|---|---|---|---|---|
| address | 1 | 2 | 3 | 4 | 5 | 6 | 7 | | N-5 | N-4 | N-3 | N-2 | N-1 | N |

| address | 1 | 2 | 3 | 4 | 5 | ... | N-5 | N-4 | N-3 | N-2 | N-1 | N |
|---|---|---|---|---|---|---|---|---|---|---|---|---|
| return address | $k_1$ | $k_2$ | $k_3$ | $k_4$ | $k_5$ | --- | $k_{N-5}$ | $k_{N-4}$ | $k_{N-3}$ | $k_{N-2}$ | $k_{N-1}$ | $k_N$ |
| return address | $j_1$ | $j_2$ | $j_3$ | $j_4$ | $j_5$ | --- | $j_{N-5}$ | $j_{N-4}$ | $j_{N-3}$ | $j_{N-2}$ | $j_{N-1}$ | $j_N$ |
| transmit or not | 1 | 0 | 0 | 0 | 0 | --- | 1 | 0 | 0 | 1 | 0 | 1 |

FIG. 22

PACKET NETWORK AND METHOD FOR CONGESTION AVOIDANCE IN PACKET NETWORKS

BACKGROUND OF THE INVENTION

1. Field of the Invention

This invention relates to packet networks with variable bit rate attributes. Specifically, the invention relates to packet networks that can transfer variable length packets, including frame relay service or ATM (Asynchronous Transfer Mode) and other fixed length packets (cells) at variable bit rates; to a method for avoiding congestion in packet networks; and to the node configurations required for these purposes.

2. Description of the Related Art

Hitherto, the transmission bit rate in a transmission line, for example, the transmission bit rate expressed in terms of bit/sec, has taken the form of a constant base rate. Similarly, switching facilities have operated at a constant base rate.

In packet networks or ATM networks, variable length packets or ATM-type fixed length packets (cells) are transferred through the network from source nodes to destination nodes via intermediate nodes. The packets are transferred on the basis of a destination address, or path or channel identifiers, corresponding to these packets. The network is constituted in such a manner that transmission is possible at user-convenient timings. These packet networks or ATM networks are constituted so that the average bit rate can vary in agreement with a users' convenience.

The following methods have been adopted as countermeasures against packet congestion in such networks.

The first system considered is a system where data transfer within the network is carried out on the basis of call admission control. Whenever packet congestion occurs, transmission from any terminal node where there is a new transmission request becomes impossible. In this case, another transmission request is made after a time, and if the congestion has cleared, the request is accepted and transmission becomes possible. In this particular case, even if congestion has occurred, transmission is still possible from terminals transmitting prior to the occurrence of the congestion. Therefore call acceptance control is not straightforward or entirely equitable.

Next, in a packet network, all terminal nodes can forward packets even if there is congestion. However, due to the congestion, overflow packets are discarded. Source nodes are notified that packets have been discarded, and re-transmission takes place. Thus, actual transmission is impossible.

The following method is employed in packet networks to cope with congestion. When packet congestion is detected, transmission restrictions are applied to the source nodes and their transmission is thereby suspended. The principles of congestion avoidance according to this method are illustrated in FIGS. 1A to 1C. FIGS. 1A to 1C show transmission of packets from a source node being suspended by means of a congestion notification from a destination (or intermediate) node.

A problem encountered with this method is that packets will be discarded when buffers in the terminal nodes have small capacity. Furthermore, transmission downtime lengthens when small capacity buffers are provided. Large-capacity buffers are needed to achieve efficient network operation, but this will result in overall network efficiency deteriorating and an increase in overall system costs. One way of ensuring that congestion does not occur would be to construct a network with plenty of surplus capacity. However, constructing a network with plenty of surplus capacity amounts to providing equipment that is used only on occasion; for example, buffers of sufficient size at intermediate and terminal nodes. This approach causes efficiency to deteriorate.

Another method for controlling congestion in packet networks is to control packet transfer by monitoring packet flow (by sampling short periods during packet transfer) and on this basis decide whether or not congestion is occurring (this is called window flow control). This technique is described in Japanese Unexamined Patent Disclosure No. 3-174848 (patent application Ser. No. 07/400,858, now issued as U.S. Pat. No. 5,193,151). The principles of congestion avoidance according to this method are shown in FIGS. 2A to 2C. According to this method, round-trip delay time is measured at source nodes. When the round-trip delay time decreases, it is estimated that the network is not in an overload condition. Thus, packet transfer from the source side is allowed to increase. On the other hand, if the round-trip delay time increases, it is estimated that the network is in an overload condition. Thus, packet transfer from the source side is decreased, halting the transfer of packets.

A problem encountered with window flow control is that packets are discarded when small capacity buffers are provided at the nodes. Moreover, the prediction of network congestion on the basis of delay times does not always agree with the actual condition of the network.

Because conventional detection of congestion amounts to detecting congestion after a state of congestion has already arisen, congestion is not prevented. In other words, conventional methods do not predict congestion of packet transmission at a future point in time on the basis of packet transfer rate at the present point of time.

In addition, conventional detection of the packet transfer rate for purposes of congestion detection does so based on a probability distribution model for traffic sources. Therefore, when packets from a large number of signal sources are multiplexed, conventional methods cannot cope with a case where signal source parameters change with time. Accordingly, because it has not predicted the packet transfer rate at a prescribed time in the future, it has not detect that congestion will occur.

SUMMARY OF THE INVENTION

An object of the present invention is to provide packet networks which avoid congestion without discarding packets. A further object of the present invention is to provide a packet network wherein high throughput can be attained even with small-capacity buffers.

These and other objectives are achieved by controlling packet transfer in the network on the basis of the concepts of acceleration or an acceleration ratio which are introduced as values that indicate the degree of increase in the packet transfer rate.

A first aspect of the present invention relates to packet networks where congestion avoidance is carried out on the basis of a value that indicates the degree of increase in the packet transfer rate, an increase rate limit. The packet network includes source nodes and destination nodes which send and receive packets via intermediate nodes. An upper limit has been established for the packet transfer rate, a rate limit, that is permissible at the aforementioned source nodes; and an upper limit is set for a value that indicates the degree of increase in the packet transfer rate, the increase rate limit, at the aforementioned source nodes.

Either acceleration, which is the rate of change with respect to time in the packet transfer rate, or acceleration ratio, which is a ratio of change with respect to time in the packet transfer rate, can be used as the increase rate limit. In addition, a lower limit or an initial bit rate can be established for the packet transfer rate at source nodes in the packet network.

Intermediate nodes or destination nodes of the packet network can be provided with means for predicting the packet transfer rate t seconds later on the basis of (a) the packet transfer rate of transit packets or the packet transfer rate of incoming packets, and (b) the aforementioned increase rate limit. These intermediate nodes or destination nodes can have a means which predicts, on the basis of the predicted packet transfer rate, that congestion will occur. In addition, the intermediate nodes or destination nodes can have a means for notifying the source nodes of congestion when congestion is predicted.

A second aspect of the present invention relates to the prediction of the packet transfer rate and to packet prediction of congestion. For each destination address, or path or channel identifier, of packets being transferred through the transmission lines, an upper limit is stipulated for the degree of increase in packet transfer rate, the increase rate limit.

A means is provided for detecting the transfer rate of currently arriving packets. Also, a means is provided for predicting the maximum packet transfer rate after time t on the basis of (a) the detected packet transfer rate and (b) the increase rate limit.

The rate prediction means which predicts the maximum packet transfer rate can have a means whereby the maximum packet transfer rate $V(t)$ after time t is obtained by computation using:

$$V(t) = V_\Sigma + \sum_{i=1}^{m} \alpha_i \cdot t$$

where $\alpha_i$ (i=1~m) are the upper limits stipulated for the packet acceleration of each of m nodes, increase rate limits, and $V_\Sigma$ is the total current packet transfer rate.

The rate prediction means can also have a means for obtaining the maximum packet transfer rate $V(t)$ after time t by computation using:

$$V(t) = \sum_{i=1}^{n} (V_{Gi} \cdot \exp(\beta_i \cdot t)) + \sum_{j=1}^{s} VI_j$$

where $\exp(\beta)$ is the upper limit stipulated for the packet acceleration ratio, the increase rate limit; the transmission lines are divided into n groups; for each group, the computation is based on (a) the maximum acceleration ratio coefficient $\beta_i$ and the maximum acceleration ratio $e^{\beta i}$ (i=1~n) within the group in question, and (b) the current packet transfer rates $V_{G1}$~$V_{Gn}$ for the various groups; $VI_j$ is the initial bit rate at each source node; and S is the total number of source nodes. Note that there is no second term when a lower limit is established for the packet transfer rate at the source nodes.

A third aspect of the present invention relates to packet transfer control at source nodes on the basis of congestion prediction signals. In a source node of a packet network where the sending and receiving of packets is carried out between source and destination nodes via intermediate nodes an upper limit has been established for the permissible packet transfer rate of these packets.

The source nodes include transmitting and decreasing means. The transmitting means transmits packets at a transfer rate that is within the aforementioned upper limit and which corresponds to a value indicating the degree of increase in the packet transfer rate up to a prescribed value, an increase rate limit. The decreasing means decreases the packet transfer rate when a congestion prediction signal indicating that congestion will occur is received from an intermediate node or a destination node.

Instead of recognizing predicted congestion through receipt of a congestion signal, the source nodes can be provided with an increase request detection means. When the increase request detection means fails to receive a request for increasing the packet transfer rate from an intermediate or destination node, predicted congestion is recognized. As a result of recognizing the predicted congestion, the source node decreases its packet transfer rate.

Furthermore, when a congestion prediction signal is received, the source node can be provided with a means which increases the transmission interval at which packets are transmitted by k (k>1) times the packet transmission interval corresponding to the packet transfer rate at that point in time. Alternatively, the source node can be provided with a means which decreases the packet transfer rate by decreasing the packet transfer rate at that point in time by a fixed ratio or a constant exponential ratio when a congestion prediction signal is received.

The source nodes can also be provided with a packet transmission control circuit for decreasing the packet transfer rate on the basis of a received congestion prediction signal. This packet transmission control circuit includes a table having elapsed times for addresses and packet transmission intervals which become exponentially shorter with the elapsed time address. Packet transmission is carried out by incrementally addressing the transmission intervals of the table. When a stipulated packet transfer rate is reached, the packet transmission control circuit returns to an elapsed time address corresponding to this stipulated packet transfer rate, and transmission of packets using the packet transmission intervals in the table can resume. Moreover, if a congestion prediction signal is received from the network, the packet transmission control circuit can also transmit packets after returning to an elapsed time address with a value that has been decreased by a fixed number or a fixed ratio.

A fourth aspect of the present invention relates to a method for avoiding congestion in packet networks. The method applies to congestion avoidance in packet networks wherein (a) sending and receiving of packets is carried out between source nodes and destination nodes via intermediate nodes, and (b) an upper limit has been established for the packet transfer rate that is permissible at the aforementioned source nodes.

The aforementioned source nodes transmit packets within the limits of the permissible packet transfer rate and within an upper limit for a value indicating the degree of increase in packet transfer rate, the increase rate limit. The aforementioned intermediate nodes or destination nodes predict the packet transfer rate at time t later based on (a) the packet transfer rate of transit packets or the packet transfer rate of incoming packets, and (b) the increase rate limit. When congestion is predicted, the aforementioned source nodes are so notified. When the aforementioned source nodes receive this notification, they decrease the packet transfer rate at that point in time. The increase rate limit can be acceleration or an acceleration ratio.

Furthermore, when source nodes receive notification that congestion is anticipated, they can decrease the packet transfer rate by a fixed value. The source nodes can also decrease the packet transfer rate by a fixed ratio or a constant exponential ratio. Moreover, notification that congestion is anticipated can be accomplished by not transmitting a packet transfer rate increase request signal to the source nodes.

Additionally, a lower limit or an initial bit rate can be established for the packet transfer rate at source nodes.

To transmit packets from a source node of a packet network according to this invention, a maximum permissible packet transfer rate and a minimum packet transfer rate ($\geq 0$) are set. In addition, an upper limit is established for the bit rate increase (i.e., the acceleration) or for the bit rate increase ratio (i.e., the acceleration ratio). The upper limit is set at a value indicating the degree to which the packet transfer rate can be increased up to the maximum packet transfer rate. Each source node is able to increase the packet transfer rate within the limits of this acceleration or acceleration ratio and the maximum permissible packet transfer rate.

As to the detection of future occurrences of congestion, let the upper limit of, for example, acceleration, be $\alpha$, and the current packet transfer rate be V. The packet transfer rate after time t can then be obtained by means of the formula $V(t) = V + \alpha \cdot t$. This predicted packet transfer rate enables a decision to be made as to whether or not congestion is anticipated. When congestion is anticipated, an intermediate node or a destination node transmits a congestion prediction signal to the source node.

When the source node receives a congestion prediction signal from the intermediate nodes or destination nodes of the packet network, the source node decreases the packet transfer rate. Moreover, the source node can be notified that congestion is anticipated and can thereby decrease its packet transfer rate, by deleting a bit rate increase request signal indicator.

Packet transfer control therefore involves controlling, at the source nodes, the packet transfer rate of packets forwarded to the transmission lines. Control is performed using either the arrival of the aforementioned congestion prediction signal or the non-arrival of a bit rate increase request signal. This packet transfer control provides a packet transmission interval table constructed in such manner that the packet transmission interval decreases exponentially with respect to increasing addresses of the table. The table enables the packet transfer rate to be increased exponentially by incrementing the address of the table. When the highest bit rate has been reached, table access is controlled so as to maintain this bit rate. On the other hand, when a congestion prediction is received, the control decreases the packet transfer rate at the source node. This is achieved by returning to a particular address or decreasing the address value by a fixed ratio or a fixed number to obtain longer transmission intervals from the table. Then increasing the table address resumes as before.

Other objects, features, and characteristics of the present invention; methods, operation and functions of the related elements of the structure; combination of parts; and economies of manufacture will become apparent from the following detailed description of the preferred embodiments and accompanying drawings, all of which form a part of this specification; wherein like reference numerals designate corresponding parts in the various figures.

BRIEF DESCRIPTION OF THE DRAWINGS

FIG. 5 is a block diagram showing the configuration of a variable packet rate terminal node or a fixed packet rate terminal node, and an intermediate node according to the present invention;

FIG. 21 is a block diagram showing another configuration for a packet transfer control circuit according to the present invention and FIG. 22 shows the contents of a table of packet transmission intervals according to the present invention.

DETAILED DESCRIPTION OF THE EMBODIMENTS

Figure 1A:
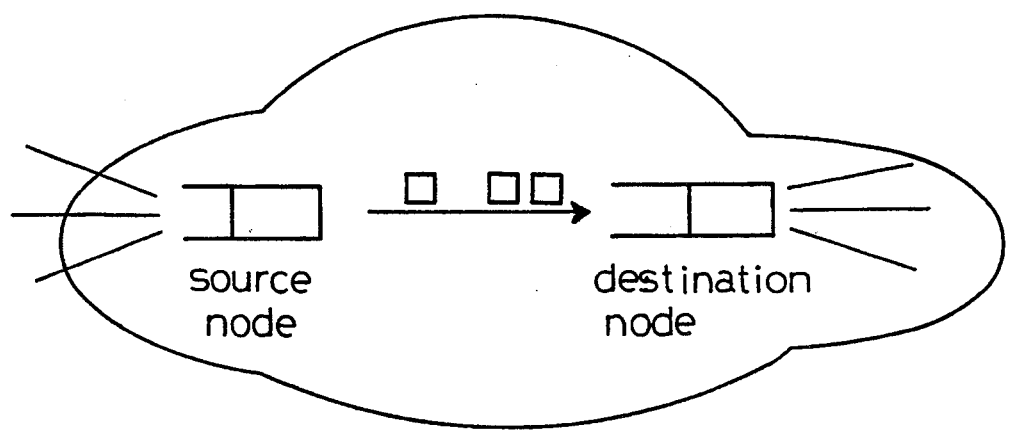
FIGS. 1A, 1B and 1C show the principles of congestion avoidance by conventional halting of transmission at source nodes.
Figure 1B:
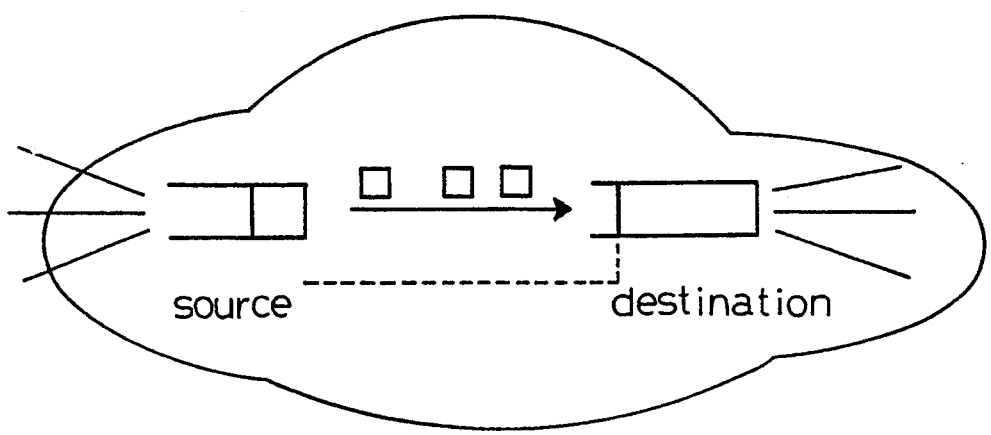
Figure 1C:
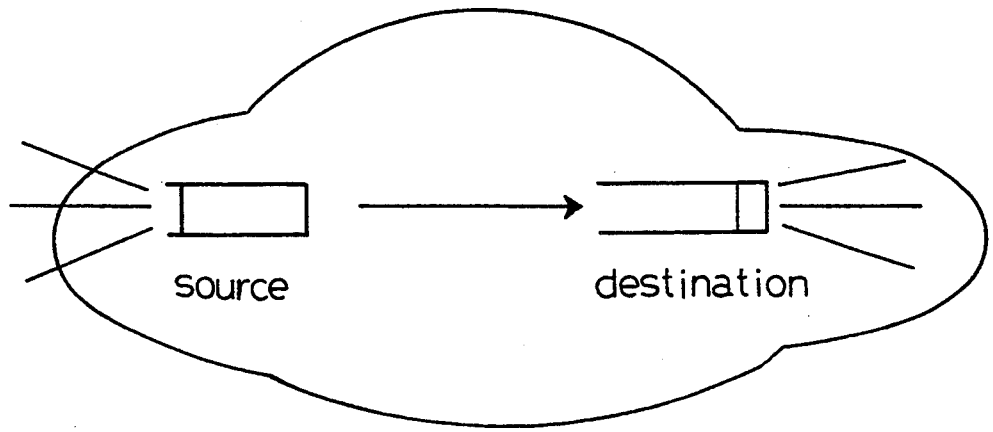
Figure 2A:
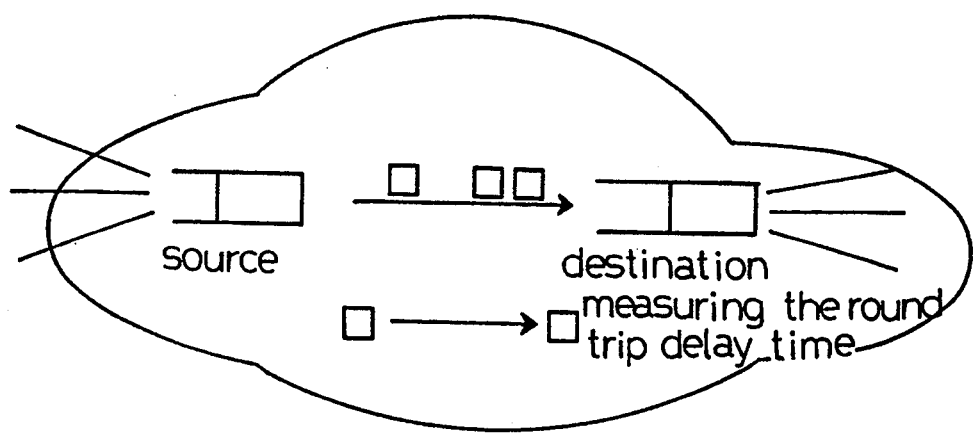
FIGS. 2A, 2B and 2C show the principles of congestion avoidance by conventional window flow control.
Figure 2B:
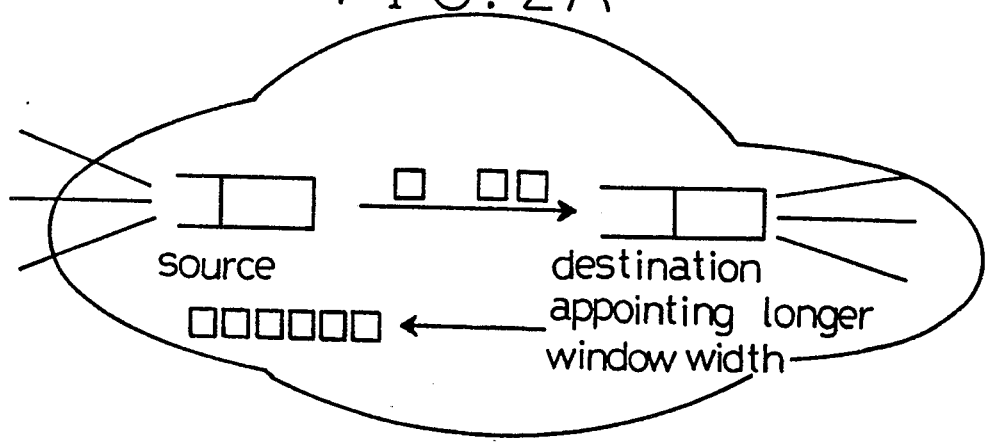
Figure 2C:
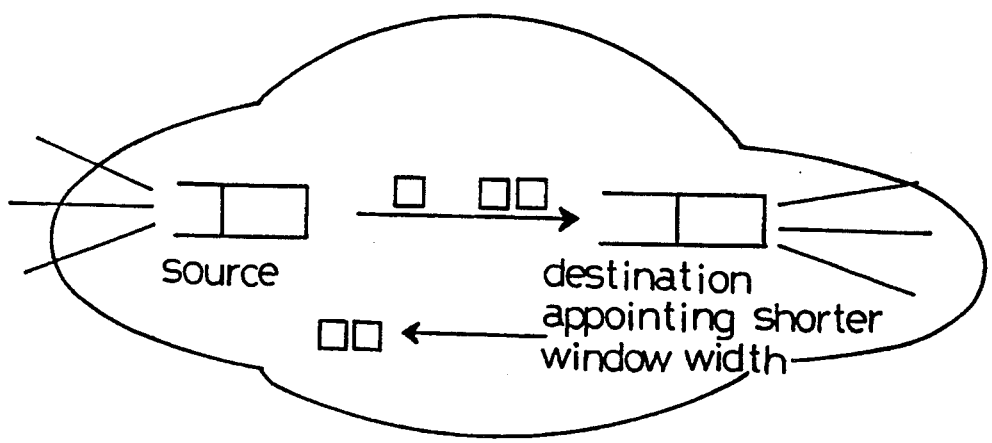
Figure 3:
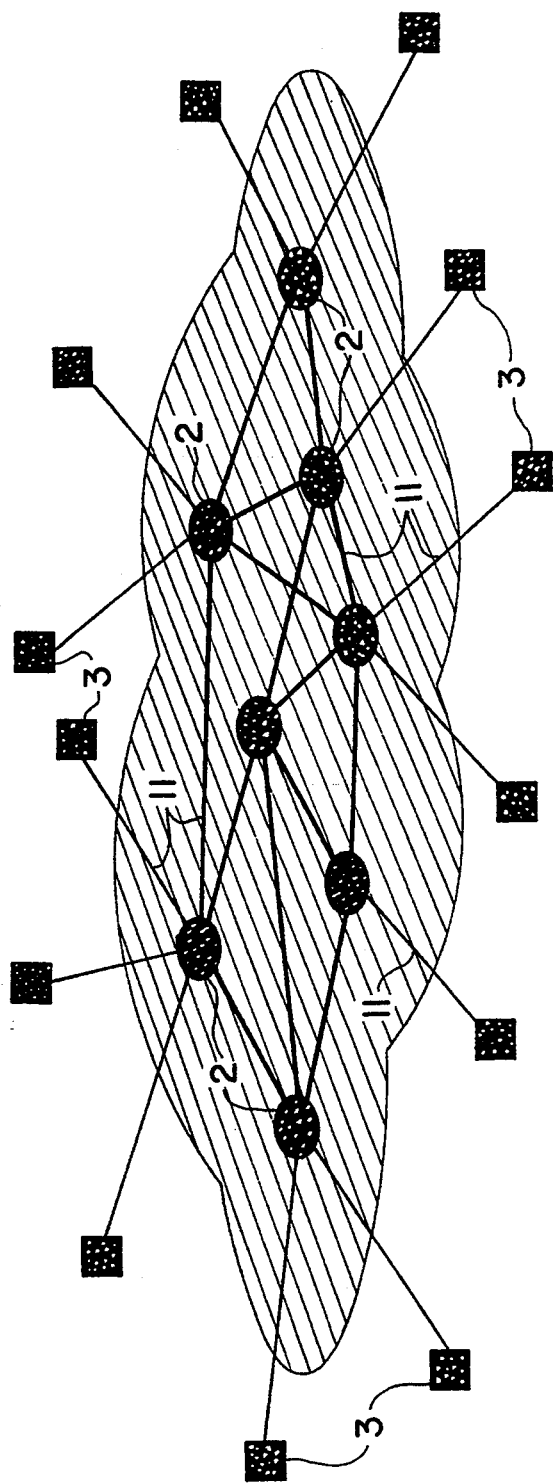
FIG. 3 shows the configuration of a packet network to which the present invention is applied.

FIG. 3 shows an example of a network configuration to which this invention is applicable. The network includes intermediate nodes 2 interconnected by transmission lines 11, and packet terminal nodes 3 provided for these intermediate nodes 2.

Figure 4:
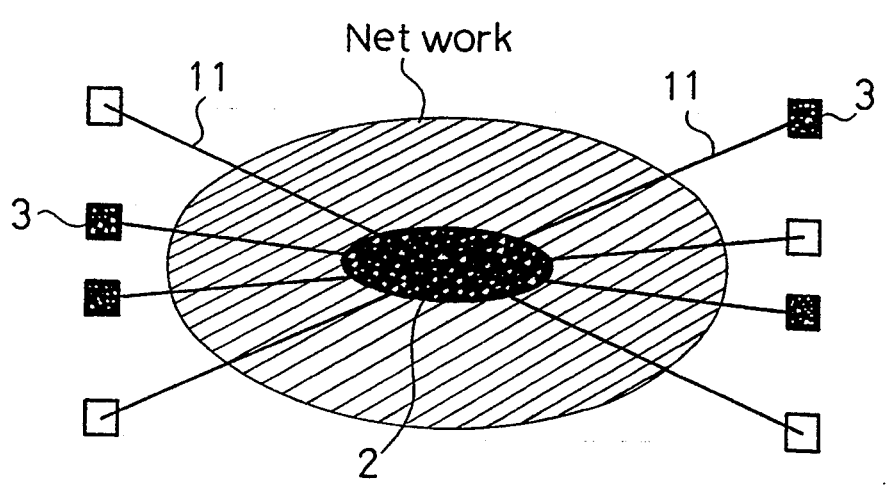
FIG. 4 represents the packet network of FIG. 3 in simplified form.

FIG. 4 represents the packet network of FIG. 3 in abbreviated form by focusing on a single intermediate node 2. The packet transmitting terminal nodes and packet receiving terminal nodes are connected via intermediate node 2. Even though the network is thus simplified to a single intermediate node 2, the general operation of congestion avoidance is not lost. There are no topological restrictions such as in the media-access control (MAC) of LANs (e.g., Ethernets, token passing, FDDI and DQDB).

EMBODIMENT 1

An example wherein packet transfer is controlled using the acceleration of packet transfer is described below.

FIG. 5 illustrates the configuration of a transmit-side packet terminal node 3 (also, referred to as the packet transmitting terminal node 3) and intermediate node 2 or destination node 2, based on the configuration depicted in FIG. 4, for describing congestion avoidance according to the present invention. The configuration of the receive-side terminal destination node is symmetrical with that of the transmit-side node, and is therefore omitted.

Intermediate node 2 has buffer memory 21 and congestion prediction circuit 25. In addition, packet transmitting terminal node 3 has packet assembly circuit 31, buffer memory 32, packet disassembly circuit 34, packet flow control (packet transmission interval control) circuit 35 and congestion prediction signal receiving circuit 39. The packet flow control circuit controls the forwarding of packets from buffer memory 32. The congestion prediction signal receiving circuit receives congestion prediction signals that have been sent from intermediate node 2 and notifies packet flow control circuit 35 of these signals.

The packet assembly circuit 31 groups data for transmission into packets and sends them to buffer memory 32. Under control of packet flow control circuit 35, the forwarding of packets in buffer memory 32 to packet transmission line 11 is started at a packet transmission interval corresponding to a prescribed low packet transfer rate (the initial rate). The packet flow control circuit 35 shortens the packet transmission interval as time passes until the maximum packet transfer rate is reached. The increase in packet transfer rate per unit time (i.e., the acceleration of packet transfer rate) is kept below a predetermined value. In addition, when congestion prediction signal receiving circuit 39 receives a congestion prediction signal, the packet transfer rate is decreased to give a packet transmission interval which is k (k>1) times the packet transmission interval corresponding to the packet transfer rate at that point in time. Thereafter, the packet transfer rate is again increased while maintaining the acceleration below the predetermined value.

An example will now be given of a method for calculating the packet transfer rate. Let the minimum packet transfer rate (the initial rate) be $V_{min}$ (bit/sec) ($v_{min}>0$), the maximum packet transfer rate be $v_{max}$ (bit/sec), the acceleration be $a$ (bit/sec$^2$), the fixed packet length be $L$ (bit), the offset time (corresponding to the minimum packet transfer rate) be $t_o$, the time taken for the packet transfer rate be $T$ (sec) (inclusive of offset time), and the current elapsed time (inclusive of offset time) within the time take for the packet transfer rate to increase be $t_{now}$ (sec). The packet transmission interval $P_{now}$ (sec) and the packet transfer rate $v_{now}$ (bit/sec) at the present point in time can therefore be expressed as follows:

$$a = V_{max}/T \quad (1)$$

$$P_{now} = L/(at_{now})(V_{min}\cdot T/V_{max} \leq t_{now} \leq T) \quad (2)$$

$$P_{now} = L/V_{max}(t_{now} = T) \quad (3)$$

$$V_{now} = L/P_{now} \quad (4)$$

Figure 6:
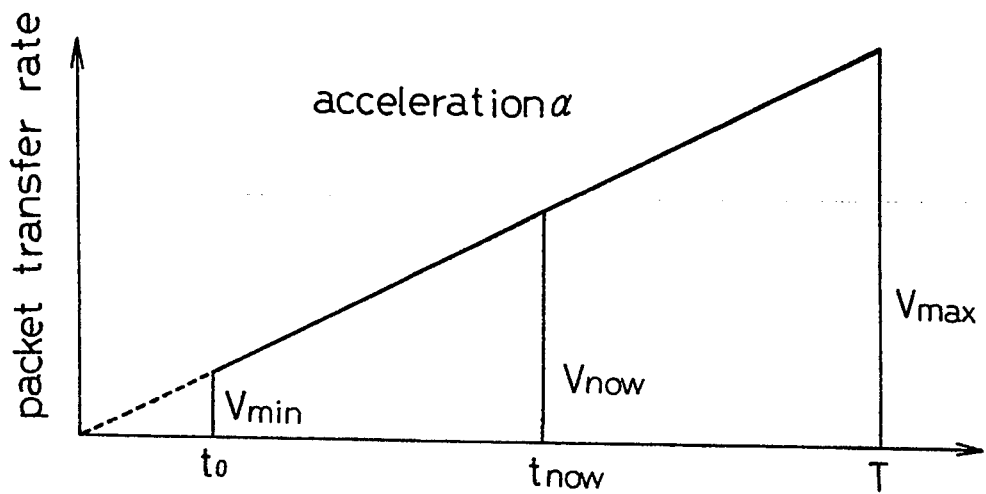
FIG. 6 is a graph of packet transfer rates versus time.

The relations among $V_{min}$, $V_{max}$, $V_{now}$, $a$, $T$, $t_{now}$ and $t_o$ are shown in FIG. 6. In this figure, the horizontal axis is elapsed time within the time taken for the packet transfer rate to increase, and the vertical axis is the packet transfer rate.

When a congestion prediction signal is received, $t_{now}/k$ (k>1) is made the new current elapsed time $t_{now}$. If $t_{now}$ is less than $t_o$, it is rounded up to $t_o$. The packet transmission interval p is then obtained from Equations (1)~(4). In this case as well, the maximum value of t is T which is equivalent to dividing the current packet transfer rate by k. U.S. Pat. No. 5,193,151 discloses this technique of obtaining T from the current packet transfer rate and k.

In each intermediate node 2 of the packet network, congestion prediction circuit 25 monitors for congestion in the packet transmission lines. When congestion is predicted on the basis of this monitoring, congestion prediction signals are formed and sent via a return packet transmission line 11 to all packet transmitting nodes that use this packet transmission line.

The number of packets per unit time monitored may be the number of packets in a sliding window unit time, which will be described hereinafter. Congestion prediction may be performed based on a detected mean value threshold, which can be realized by a first or higher order recursive filter.

A threshold value $V_{th}$ is set so that $V_{th} \leq V_{now}$, where:

$$2D \times a \times n + V_{now} = V_{max}$$

Where $V_{now}$ is the current packet transfer rate; 2D is equal to or greater than the maximum round-trip delay time between packet transmitting terminal node 3 and intermediate node 2; $a$ is the acceleration at packet transmitting terminal node 3; n is the number of packet terminal nodes that use packet transmission line 11; and $V_{max}$ the permissible packet transfer rate.

Figure 7:
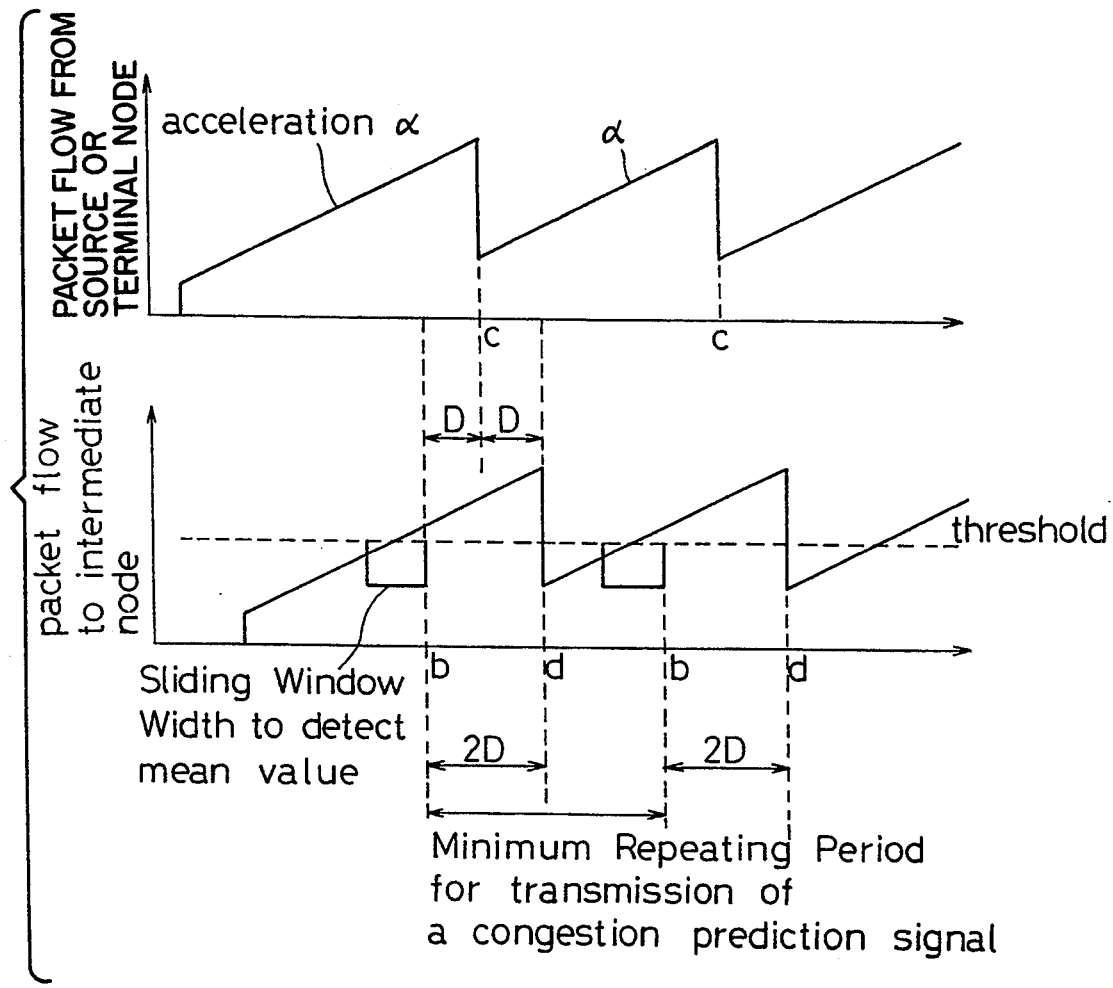
FIG. 7 are graphs of the temporal relation between (1) the flow rate of packets output from a packet transmitting terminal node and (2) the flow rate of packets input to an intermediate node, according to an embodiment of the present invention.

FIG. 7 shows the relation between (1) the flow rate per unit time of packets output from packet transmitting node 3, and (2) the flow rate per unit time of packets input to intermediate node 2; where D is the delay time between packet transmitting terminal node 3 and intermediate node 2. Intermediate node 2 predicts congestion at time b and sends a congestion prediction signal to packet transmitting terminal node 3. Packet transmitting terminal node 3 receives the congestion prediction signal at time c, which is delay time D later, and decreases the packet transfer rate by 1/k (k>1). The packet transfer rate decreases at intermediate node 2 at time d, which is 2D after the congestion prediction signal was sent. Consequently, to prevent buffer overflow in the interval from time b to time d, the upper limit of acceleration α at packet transmitting terminal node 3, the threshold value and the minimum repeating period for transmission of a congestion prediction signal have to be selected after taking delay time D and the number of packet terminal nodes n into consideration.

This method of multiplying the current packet transmission interval by a factor k when a congestion prediction signal is produced, permits equitable use of transmission line 11 by all packet terminal nodes which forward packets. Furthermore, by decreasing the current packet transfer rate by a fixed value when a congestion prediction signal is produced, gives priority of use of transmission line 11 to those packet terminal nodes.

Figure 8:
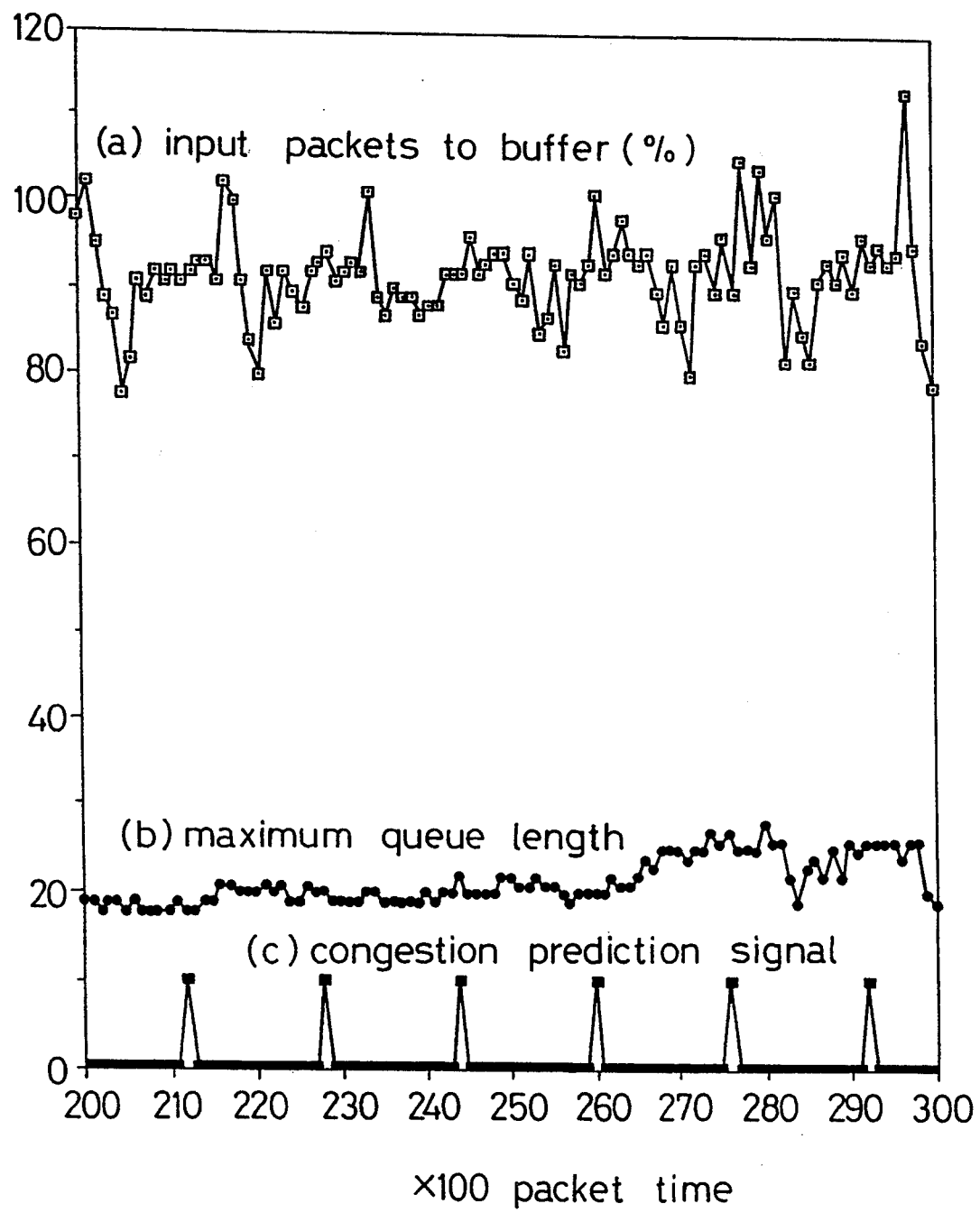
FIG. 8 is a graph of the results of a congestion avoidance simulation at an intermediate node of the present invention when k=1.25.

FIG. 8 shows the results of simulation of congestion avoidance in intermediate node 2 when k=1.25. The simulation parameters were as follows:

| | |
|---|---|
| Fixed packet length L | 53 bytes |
| Packet line rate (packet transfer rate) | 150 Mbit/sec |
| Number n of packet terminal nodes using congested intermediate node | 100 |
| Minimum packet transfer rate A (initial rate) of packet transmitting terminal nodes | 300 kbit/sec |
| Maximum packet transfer rate $V_{max}$ of packet transmitting terminal nodes | 15 Mbit/sec |
| Time T taken for packet transfer rate increase of packet transmitting terminal nodes | 250 msec |
| Increase in packet transfer acceleration (α) of packet transmitting terminal nodes | 58.8 Mbit/sec$^2$ |
| Round-trip delay time 2D | 2 msec |
| Threshold $V_{th}$ (mean packet transfer rate in 1 msec sliding window) | 150 × 0.85 Mbit/sec |
| Minimum repeating period for transmission of a congestion prediction signal | 4.5 msec |

In FIG. 8, (a) indicates the number of packets which are arriving at the input to buffer memory 21 of intermediate node 2 per unit time as a function of the output capacity per unit time of the intermediate node as observed every 100 packets (0.282 msec); (b) indicates the maximum queue length in buffer memory 21 in terms of number of packets; and (c) shows the times at which a congestion prediction signal is produced. FIG. 8 shows that if buffer capacity is 40 packets, packet dropping can be avoided and a throughput of 0.9 can be guaranteed.

EMBODIMENT 2

Next, an explanation will be given, with reference to FIGS. 5 and 9, of a configuration wherein the control of packet transfer is carried out using the packet transfer rate acceleration ratio.

In this configuration, congestion prediction circuit 25 of intermediate node 2 predicts congestion when the value obtained by adding the current packet transfer rate $V_{now}$ in the packet transmission line to the product $(2D \times \beta \times V_{now})$ or when $V_{now} \times \exp(\beta \cdot 2D)$ exceeds the maximum permissible packet transfer rate $V_{max}$; where 2D is equal to or greater than the maximum round-trip delay time between packet transmitting terminal node 3 and intermediate node 2; and β is an acceleration ratio coefficient (acceleration ratio: $e^\beta$).

When congestion prediction signal receiving circuit 39 receives a congestion prediction signal, the packet transfer rate is decreased by setting a packet transmission interval corresponding to $(A \times (V_{now}/A)^y)$. The packet transmission interval is the value obtained by dividing the packet transfer rate $V_{now}$ at that point in time by a minimum packet transfer rate A, raising this to the power y where y is a constant (y<1), and multiplying this by the minimum packet transfer rate A.

An example of how the packet transfer rate is calculated in this case will now be shown. Let the minimum packet transfer rate (the initial rate) be A (bit/sec), the maximum packet transfer rate be $V_{max}$ (bit/sec), the acceleration ratio coefficient be β (1/sec), the time taken for the packet transfer rate to increase from the minimum packet transfer rate to the maximum packet transfer rate be T (sec), the fixed packet length be L (bit), and the current elapsed time within the time during which packet transfer rate be $t_{now}$ (sec). The packet transmission interval $P_{now}$ (sec) and the packet transfer rate $V_{now}$ (bit/sec) at the present point in time are therefore:

$$V_{now} = A \times \exp(\beta \times t_{now}) \quad (5)$$

$$P_{now} = L/V_{now} \quad (6)$$

$$\beta = (1/T)\log(V_{max}/A) \quad (7)$$

In addition, the packet transfer rate $V_{up}$ (bit/sec) at time δt (sec) after current time $t_{now}$ will be:

$$\begin{aligned}
V_{up} &= A \times \exp(\beta \times (t_{now} + \delta t)) = V_{now} \cdot \exp(\beta \cdot \delta t) \\
&= V_{now}(1 + \beta \cdot \delta t) \ldots (\beta \cdot \delta t < 1) \\
&= V_{now} + v_{now} \times \beta \times \delta t
\end{aligned} \quad (8)$$

Acceleration at the current point in time is therefore:

$$V_{now} \times \beta \times \delta t/\delta t = V_{now} \times \beta (\text{bit/sec}^2)$$

which is proportional to packet transfer rate at the current point in time.

When a congestion prediction signal is received, $y \times t_{now}$ (y<1) is set as the new current elapsed time $t_{now}$, and the decreased packet transfer rate $V_{down}$ (bit/sec) can be obtained from Equation (5):

$$V_{down} = A \times \exp(\beta \times y \times t_{now}) \quad (9)$$
$$= A \times (\exp(\beta \times t_{now}))^y$$
$$= A \times (V_{now}/A)^y$$

This is equivalent to decreasing the transfer rate by a constant exponential ratio, so the transfer rate may simply be decreased to $(V_{now})^y$.

Threshold $V_{th}$ is set so that $V_{th} \leq V_{now}$ when the value $(V_{now}+V_{now}\cdot\beta\cdot 2D)$, obtained by adding $V_{now}$ to the product of (a) time 2D (which is greater than or equal to the maximum round-trip delay time between packet transmitting terminal nodes 3 and intermediate node 2), (b) acceleration ratio coefficient $\beta$ (acceleration ratio: $e^\beta$) and (c) current packet transfer rate $V_{now}$ in the packet transmission line, or $V_{now}\cdot\exp(\beta\cdot 2D)$ is equal to the permissible packet transfer rate $V_{max}$. In other words, when:

$$V_{now}=V_{max}/(1+\beta\cdot 2D) \quad (10)$$

Figure 9:
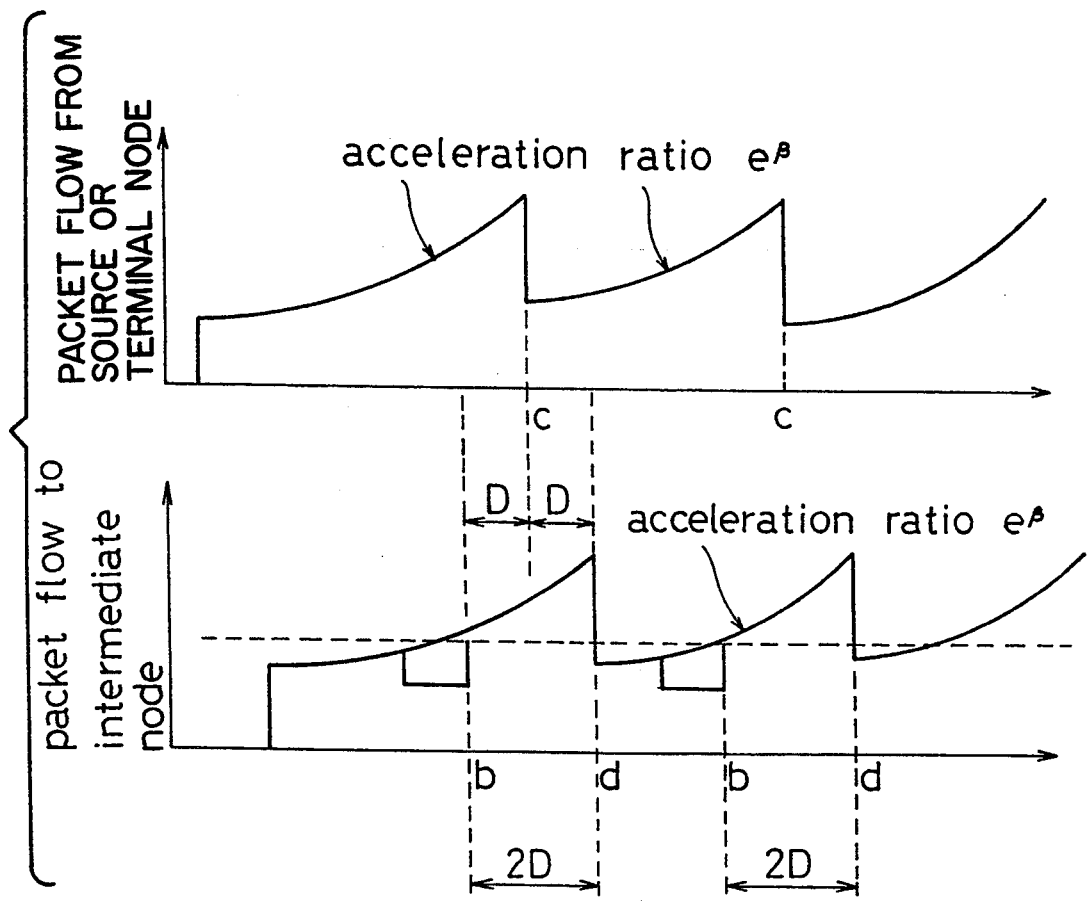
FIG. 9 is a graph of the temporal relation between (1) the flow rate of packets output from a packet transmitting terminal node and (2) the flow rate of packets input to an intermediate node, according to an embodiment of the present invention.

FIG. 9 shows the temporal relation between (1) the flow rate of packets output from packet transmitting terminal node 3, and (2) the flow rate of packets input to intermediate node 2. Let the delay time between packet transmitting terminal node 3 and intermediate node 2 be D. It is assumed that this delay time D includes a delay fluctuation at intermediate node 2. Intermediate node 2 predicts congestion at time b when the packet transfer rate corresponds to the threshold level, and sends a congestion prediction signal to packet transmitting terminal node 3. Packet transmitting terminal node 3 decreases the packet transfer rate at time c, which is time D after the congestion prediction signal was sent. The packet transfer rate drops at intermediate node 2 at time d, which is time 2D after the congestion prediction signal was sent. Accordingly, to prevent buffer overflow in the interval from time b to time d, consideration must be given to delay time D and the congestion prediction time when selecting (a) coefficient $\beta$ for determining the packet transfer acceleration ratio at packet transmitting terminal node 3, (b) coefficient y (y<1) for decreasing the packet transfer rate when a congestion prediction signal is received, (c) the threshold level Vth, and (d) the minimum repeating period for transmission of congestion prediction signals.

An explanation will now be given of how these parameters are set.

Assume that N packet transmitting terminal nodes are currently using the packet transmission line under consideration, and that the current packet transfer rate of packet transmission terminal node $i(i=1\sim n)$ is $V_{now}$. The packet transfer rate $V_{now}$ observed in the packet transmission line under consideration is therefore:

$$V_{now} = \sum_{i=1}^{n} V_{now,i} \quad (11)$$

In addition, the packet transfer rate $V_{up}$ that will be predicted in the packet transmission line in question after time $T_p$ from the present time will be:

$$V_{up} = \sum_{i=1}^{n} V_{now,i} \cdot \exp(\beta \times T_p) = V_{now} \cdot \exp(\beta \times T_p) \quad (12)$$
$$= V_{now} \times (1 + \beta \times T_p)$$

Thus, $V_{up}$ can be predicted without knowing the number of packet transmitting terminal nodes that are using the packet transmission line under consideration. Note that the quantity of packets which the packet transmitting terminal node transmits immediately after packet transfer begins cannot be predicted at an intermediate node; but because this packet quantity is small, it may be ignored. If the initial packet quantity cannot be ignored, the threshold level $V_{th}$ may be set on the basis of assigning this initial value a fixed packet transfer rate as an offset. Accordingly, assuming that $T_p=2D$ and $V_{up}=V_{max}$, the threshold level $V_{th}$ can be determined from Equations (10) and (12) independently of the number of terminals in use.

In this embodiment, when a packet transmitting terminal node receives a congestion prediction signal from an intermediate node, the resulting decrease in the packet transfer rate is proportional to the packet transfer rate at that point in time. For this reason, if congestion of a packet transmission line continues at an intermediate node for more than a certain time, the packet transfer rates of all the transmitting terminal nodes in use become more or less equal. Fairness can therefore be guaranteed for the packet transmitting terminal nodes that are in use. Moreover, these packet transmitting terminals can be given priority for using the network if the packet transfer rate is decreased by a fixed ratio when a congestion prediction signal is received. The same result is achieved if the transfer rate in Equation (5) is obtained after subtracting a fixed time t from the current elapsed time $t_{now}$ and taking this as the new elapsed time.

Figure 10:
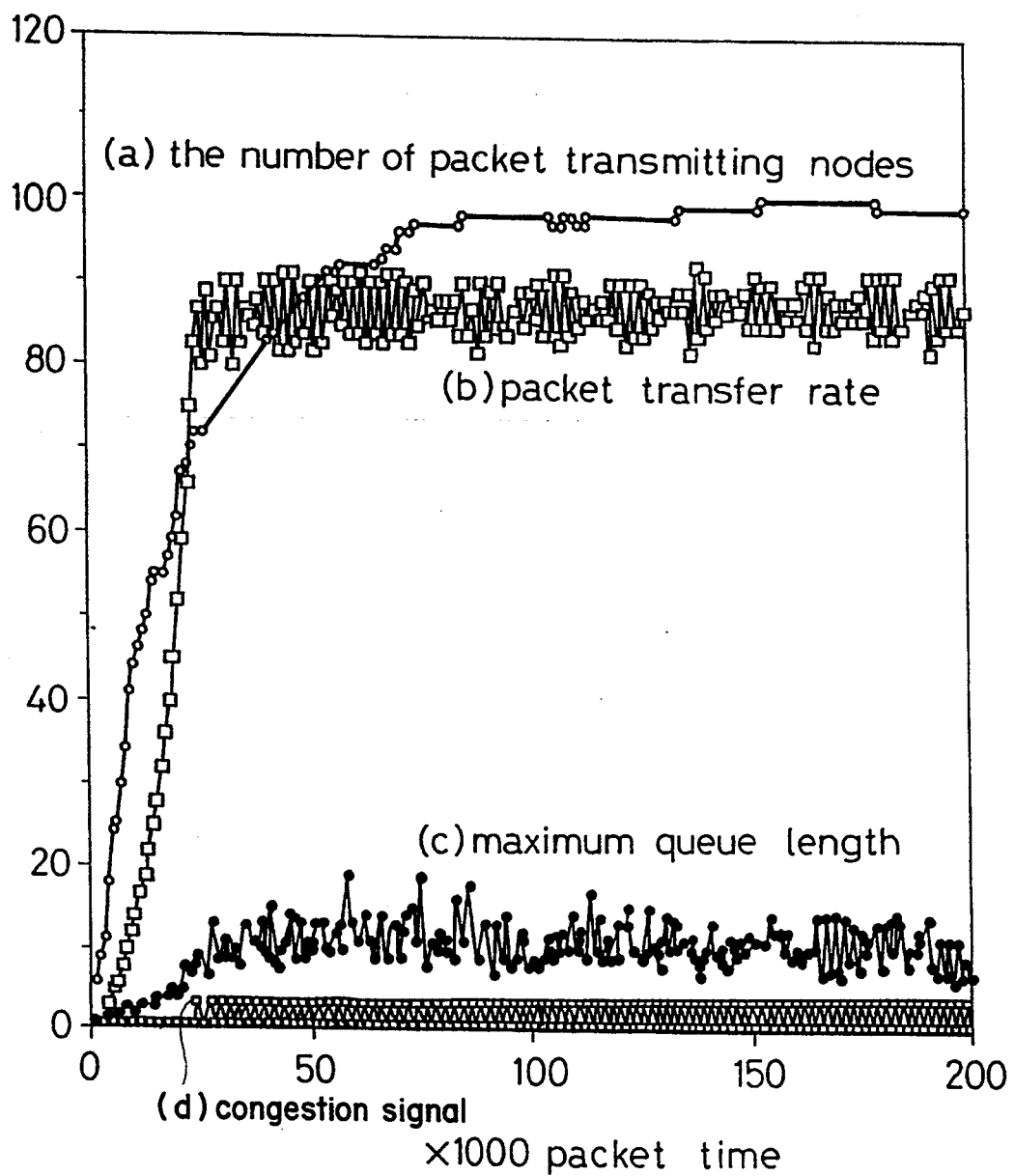
FIG. 10 shows the results of congestion avoidance at an intermediate node.
Figure 11:
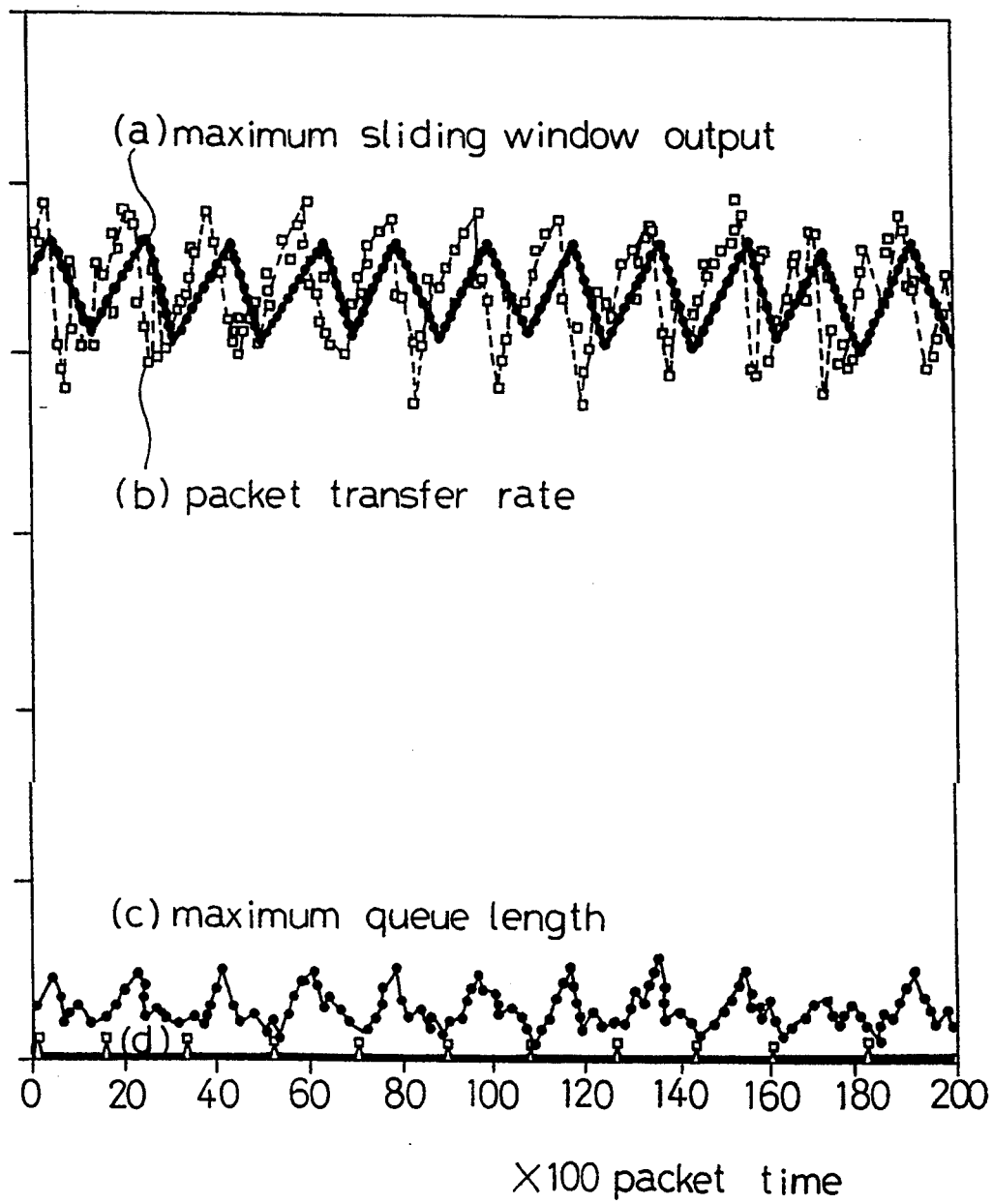
FIG. 11 is a graph of the results of a congestion avoidance simulation at an intermediate node of the present invention.

The results of a simulation of congestion avoidance in intermediate node 2 and packet transmitting terminal node 3 when rate reduction coefficient y=0.87 are shown in FIGS. 10 and 11. The simulation parameters used are as follows. Note that the round-trip delay times between congested intermediate node 2 and each packet transmitting terminal node 3 are assumed to be distributed uniformly between 2 msec and 3 msec.

| | |
|---|---|
| Fixed packet length L | 53 bytes |
| Packet line rate (packet transfer rate) | 150 Mbit/sec |
| Number n of packet transmitting terminal nodes which can use congested intermediate node simultaneously | 100 |
| Minimum packet transfer rate A (initial rate) of packet transmitting terminal nodes | 300 kbit/sec |
| Maximum packet transfer rate $V_{max}$ of packet transmitting terminal nodes | 15 Mbit/sec |
| Time T taken for packet transfer rate increase of packet transmitting terminal nodes | 100 msec |
| Acceleration ratio coefficient $\beta$ of packet transmitting terminal nodes | 39.12 (1/sec) |
| Acceleration ratio $\exp(\beta)$ of packet transmitting terminal nodes | $50^{10} = 9.76 \times 10^{16}$ |
| Round-trip delay time 2D | 2 msec ~ 3 msec |
| Threshold $V_{th}$ (mean packet transfer rate in 1 msec sliding window) | $150 \times 0.85$ Mbit/sec |
| Minimum repeating period for transmission of a congestion prediction signal | 4.5 msec |

FIG. 10 is a plot of the results of observations made every 1000 packets (2.82 msec) of changes with respect to time in the maximum buffer memory queue length and the packet transfer rate of congested intermediate node 2 for the case where a large number of packet transmitting terminal nodes 3 all began transmitting packets at once. In FIG. 10, (a) is the number of packet transmitting terminal nodes currently transmitting packets, (c) is the maximum queue length in the buffer memory within the observation interval, (b) indicates the packet transfer rate in the buffer input of the congested intermediate node as a percentage of a base packet transfer rate of 150 Mbit/sec, and (d) shows the times at which a congestion prediction signal is produced. This simulation shows that even when a large number of packet transmitting terminal nodes 3 begin transmitting packets simultaneously, congestion avoidance is performed in a stable manner with no buffer overflow despite small buffer capacity.

FIG. 11 is a plot of the results of observations made every 100 packets (0.282 msec) of the congestion avoidance situation for the case where 100 packet transmitting terminal nodes 3 are using the packet transmission lines of congested intermediate node 2. In FIG. 11, (a) indicates the maximum value of the sliding window output during the observation time as a percentage, while (b), (c) and (d) are the same as in FIG. 10. This simulation shows that a congestion prediction signal is produced at the point in time when the sliding window output exceeds the threshold level, with congestion avoidance being carried out as a result.

EMBODIMENT 3

Next, an explanation will be given of congestion avoidance in packet integrated networks wherein the network has variable rate terminal nodes and fixed rate terminal nodes.

Figure 12:
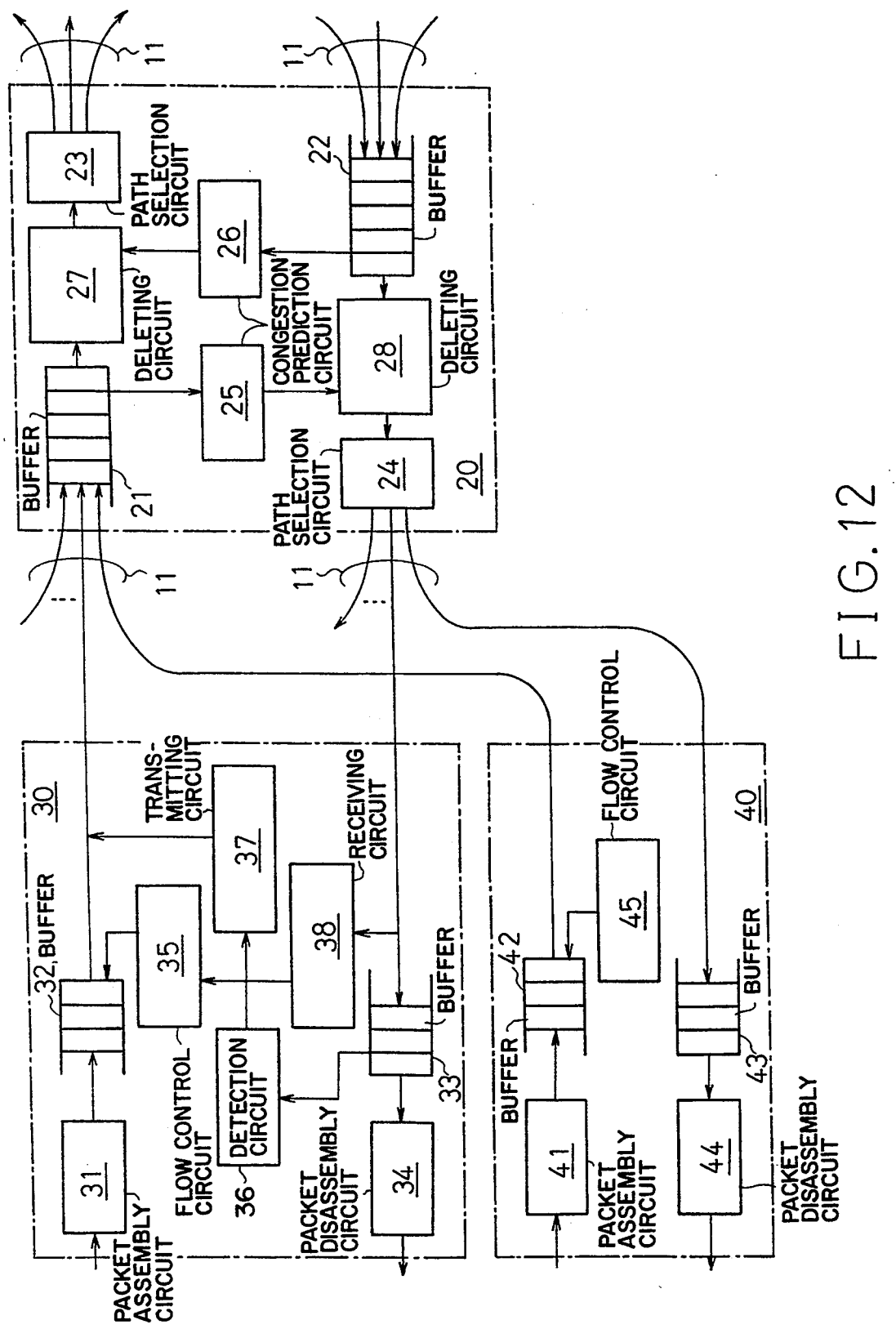
FIG. 12 shows a configuration of a variable rate terminal node, fixed rate terminal node, and intermediate node according to an embodiment of the present invention.

FIG. 12 shows a single intermediate node 20, a single variable rate terminal node 30 and a single fixed rate terminal node 40 of a packet integrated network. Intermediate node 20 is interconnected in a mesh-like manner within the packet integrated network by way of transmission lines 11. Variable rate terminal nodes 30 and fixed rate terminal nodes 40 are each connected by way of transmission lines 11 to corresponding intermediate nodes 20, and the 1:1, 1:n, N:1 and N:M paths that are established between them are based on two-way connections via intermediate nodes 20. Note that apart from the 1:1 connections, the paths involve branching and joining at intermediate nodes 20 are not shown.

Shown in FIG. 12, variable rate terminal node 30 includes packet assembly circuit 31, buffer memory 32, buffer memory 33, packet disassembly circuit 34, packet flow control circuit 35, buffer capacity detection circuit 36, rate increase request indication transmitting circuit 37 and rate increase request indication receiving circuit 38. Packet assembly circuit 31 and buffer memory 32 carry out packet transmission, and buffer memory 33 and packet disassembly circuit 34 carry out packet receiving.

Fixed rate terminal node 40 includes packet assembly circuit 41, buffer memory 42, buffer memory 43, packet disassembly circuit 44, and packet flow control circuit 45. Packet assembly circuit 41 and buffer memory 42 carry and out packet transmission, and buffer memory 43 and packet disassembly circuit 44 carry out packet receiving.

Intermediate node 20 includes buffer memories 21 and 22 and path selection circuits 23 and 24, which carry out relaying of packets in both directions. Intermediate node 20 also includes congestion prediction circuits 25 and 26, and rate increase request indication deleting circuits 27 and 28.

Next, the operation of the embodiment shown in FIG. 12 will be described.

(1) Transmission when a path has been established between variable rate terminal node 30 and an opposing node 1. Operation of variable rate terminal node 30

Packet assembly circuit 31 groups information that has been input to variable rate terminal node 30 into packets, and these packets are stored in buffer memory 32. Packet flow control circuit 35 controls buffer memory 32 and sends packets to transmission line 11 at a prescribed packet transfer rate.

Meanwhile, packets which have arrived from transmission line 11 are stored in buffer memory 33 and output after the original information has been reconstructed by packet disassembly circuit 34. At this time, buffer capacity detection circuit 36 detects the buffer capacity of buffer memory 33.

If the buffer capacity of buffer memory 33 is below a prescribed value, at which there is no danger of overflow, rate increase request indication transmitting circuit 37 repeatedly sends packets containing a rate increase request indication to transmission line 11; at or within a prescribed time interval. The packets containing a rate increase request indication may either be new packets with rate increase request indications, or packets transmitted from buffer memory 32 which have had a rate increase request indication formed in a rate increase request indication area established as part of the packets. Note that in this latter case, if the prescribed time interval elapses without any packets being transmitted, new packets with rate increase request indications will be generated.

Thus, variable rate terminal node 30 will ordinarily transmit packets containing rate increase request indications at or within a prescribed time interval. On the other hand, if buffer memory 33 starts to overflow, buffer capacity detection circuit 36 suspends the operation of rate increase request indication transmitting circuit 37. The variable rate terminal node 30 on the transmitting side is notified of the suspended rate increase request indications by packets which it receives that lack rate increase request indications.

Rate increase request indication receiving circuit 38 monitors incoming packets. If packets containing rate increase request indications are received at or within a prescribed time interval, the packet transfer rate control which packet flow control circuit 35 performs is maintained. If a packet containing a rate increase request indication has not been received within the prescribed interval, it is recognized that there is a possibility of congestion. The packet flow control circuit 35 then decreases the packet transfer rate at that point in time.

2. Operations of intermediate node 20

In intermediate node 20, packets from each terminal node are input via transmission lines 11 to buffer memories 21 and 22 and stored. Congestion prediction circuit 25 detects either the total transfer rate, quantity of packets input to buffer memory 21, or the total quantity of packets output from buffer memory 21. If congestion is predicted, congestion prediction circuit 25 starts rate increase request indication deleting circuit 28. Likewise, congestion prediction circuit 26 starts rate increase request indication deleting circuit 27. Rate increase request indication deleting circuits 27 and 28 delete, from packets, the request indications for increases in the transfer rate of packets transmitted through corresponding paths or transmission lines in the opposite direction. When new packets carrying only rate increase request indications under go the deletion operation, the new packets themselves are deleted. When only a part of the packets contain a rate increase request indication, only this rate increase request indication part (ex. correspond of BECN bit of Frame relay) is deleted.

Intermediate node 20 errs on the safe side when predicting congestion by basing the prediction on the predicted round-trip delay time 2d between intermediate node 20 and the most distant variable rate terminal node 30. The round-trip delay time 2d includes the control delay time from detection by congestion prediction circuit 25 to the packet transfer rate being decreased by packet flow control circuit 35 plus the delay times in the buffer memories of the intermediate node, etc.

Packets which have been output from buffer memories 21 and 22 and which have passed through rate increase request indication deleting circuits 27 and 28 are sent to transmission lines 11 after respective output paths have been selected by path selection circuits 23 and 24.

Thus, when an intermediate node 20 between variable rate terminal nodes 30 predicts congestion, the variable rate terminal nodes 30 on the transmitting side can recognize the predicted congestion by the lack of rate increase request indications pertaining to the path and transmission line. In other words, because packets containing rate increase request indications cease to be received within a prescribed time interval at the transmitting side variable rate terminal node 30, the possibility of congestion can be recognized. Congestion at intermediate node 20 can therefore be avoided by decreasing the packet transfer rate at that point in time.

(2) Transmission when a path has been established between fixed rate terminal node 40 and an opposing node A path between fixed rate terminal nodes 40 can be established when the proportion of Constant Bit Rate service (CBR/(CBR+VBR)) does not exceed the ratio F that is allocated to CBR service in the transmission lines comprising the path. Thus, this path provides guaranteed capacity within the integrated packet network. This is the basis for establishing paths between all fixed rate terminal nodes 40. Consequently, in establishing a new path between fixed rate terminal nodes 40, if there are places in some of the transmission lines which exceeds ratio F allocated to CBR service; that particular path is not allowed. Instead, a fresh search is made for a path where ratio F is not exceeded. This restriction enables the upper limit of the proportion of a path accounted for by fixed bit rate information in a packet integrated network to be kept below the ratio F, and means that at least (1−F) can be allocated to transmission of variable bit rate information.

1. Operation of fixed rate terminal node 40

Information which has been input to fixed rate terminal node 40 is grouped into packets by packet assembly circuit 41 and stored in buffer memory 42. Packet flow control circuit 45 controls buffer memory 42 and sends packets to transmission line 11 at a prescribed packet transfer rate. Note that the maximum packet transfer rate is the packet transfer rate that was secured when the path was established.

Meanwhile, packets that have arrived from transmission line 11 are stored in buffer memory 43 and are output after the original information has been reconstructed by packet disassembly circuit 44.

2. Operation of intermediate node 20 with respect to fixed rate terminal node 40

The operation of intermediate node 20 is the same as that of an intermediate node 20 in relation to a variable rate terminal node 30. However, the operation of congestion prediction circuits 25 and 26 and rate increase request indication deleting circuits 27 and 28 is irrelevant.

Thus, in fixed rate terminal node 40 there is no buffer capacity detection circuit 36, rate increase request indication transmitting circuit 37 or rate increase request indication receiving circuit 38. Transmission control is performed simply by packet flow control circuit 45. This means that fixed rate terminal node 40 is not affected by notifications that congestion is predicted within the network. In other words, in transmission between fixed rate terminal nodes 40, the packet transfer rate is controlled by packet flow control circuit 45 alone, independently of the state of the network.

To avoid congestion without discarding packets, it is necessary to predict accurately the maximum value of the packet transfer rate at intermediate node 20. An accurate prediction of this maximum packet transfer rate may be obtained on the basis of the upper limit of the acceleration or acceleration ratio of the packet transfer rate. If acceleration is used, a maximum packet transfer rate increase that is dependent on the number of terminal nodes can be predicted. If the acceleration ratio is used, a maximum packet transfer rate increase that is independent of the number of terminal nodes can be predicted.

However, in this embodiment, if the transfer rate is less than that secured by the fixed rate terminal nodes 40 when the path was established, an increase in the packet transfer rate at the fixed rate terminal nodes 40 may occur. If congestion has been predicted within the network, packet dropping will occur unless some decrease in the packet transfer rate is contrived. The decrease should take into account the aforementioned anticipated increase in packet transfer rate at fixed rate terminal nodes 40. In other words, variable rate terminal nodes 30 will have to clarify the size of this decrease in the packet transfer rate.

Next, the amount of reduction in the packet transfer rate that is required to avoid congestion will be explained with reference to the graphs given in FIGS. 13-16.

Figure 13:
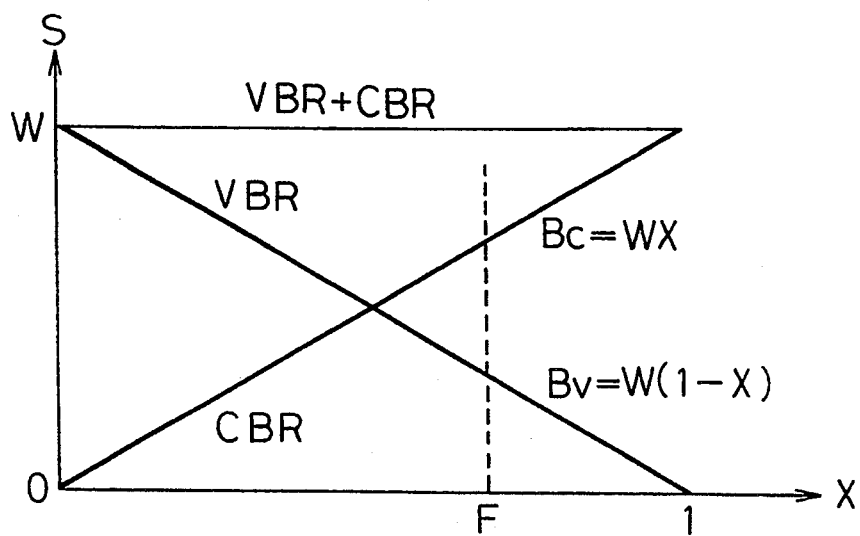
FIG. 13 is a graph of the relation between the bit rates of the Constant Bit Rate (CBR) service and the Variable Bit Rate (VBR) service.

FIG. 13 shows the relation between bit rates in Constant Bit Rate (CBR) service and Variable Bit Rate (VBR) service. This is used to predict the packet transfer rate at intermediate nodes 20.

In this figure, the horizontal axis X shows the proportion of Constant Bit Rate service (CBR/(CBR+VBR)), the vertical axis S is the throughput, and W is the maximum permissible throughput at which no packets from any transmission line 11 are discarded. Note that in CBR service the upper limit occupied by constant bit rate information is F, $0 \leq X \leq F < 1$.

Given that constant rate terminal nodes do not decrease the packet transfer rate when congestion is predicted, it follows that the maximum permissible throughput W will not increase at X=F. Described below are the conditions such that bit rate $B_c$ of the CBR service and bit rate $B_v$ of the VBR service are not exceeded when the bit rate $B_c$ becomes WX and it is predicted that the bit rate $B_v$ becomes $W(1-X)$ at time t=o.

Figure 14:
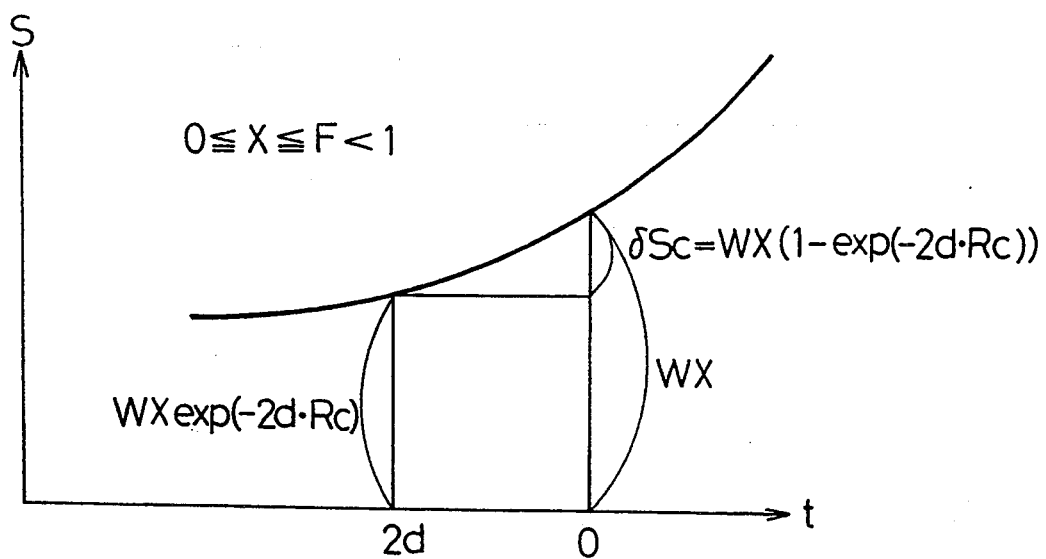
FIG. 14 is a graph of the change in bit rate with respect to time for Constant Bit Rate (CBR) service (fixed acceleration ratio)
Figure 15:
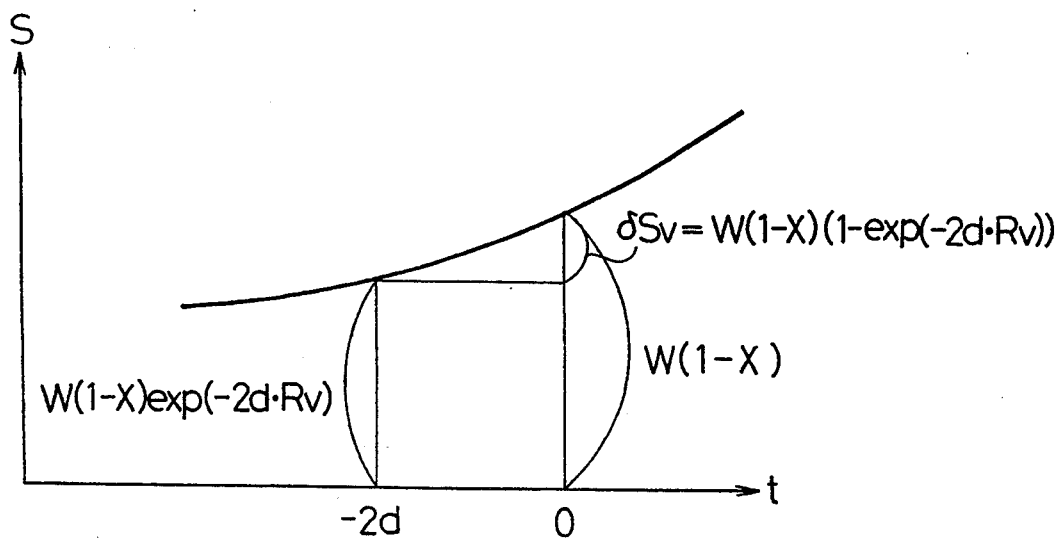
FIG. 15 is a graph of the change in bit rate with respect to time for Variable Bit Rate (VBR) service (fixed acceleration ratio)

FIGS. 14 and 15 show changes with respect to time in bit rates of CBR and VBR services (for a fixed acceleration ratio). In these figures, the horizontal axis t is time and the vertical axis S is throughput. The acceleration ratios over time 2d (the round-trip delay time between intermediate node 20 and the most distant variable rate terminal node 30) are exp(2d−Rc) and exp(2d−Rv) for the CBR and VBR services, respectively. Rc is the acceleration ratio coefficient of the CBR terminals, and Rv is the acceleration ratio coefficient of the VBR terminals.

The increase $\delta Sc$ in CBR service bit rate after time 2d has elapsed is:

$$\delta Sc = WX(1-\exp(-2d \cdot Rc))$$

and the increase $\delta Sv$ in VBR service bit rate after time 2d has elapsed is:

$$\delta Sv = WX(1-X)(1-\exp(-2d \cdot Rv))$$

In addition, because the total bit rate at t=0 reaches the maximum permissible throughput W, the variable rate terminal nodes, which are able to decrease their packet transfer rates, are informed of this at time t=−2d. Since packets containing rate increase request indications do not arrive at these variable rate terminal nodes, the bit rate is decreased after a maximum time delay of d. The decrease is obtained by multiplying the packet transfer rate by K(O<K<1). Transmission continues at an acceleration ratio of exp(2d−Rv), so that the rate becomes $W(1-X)K$ at t=0. This is illustrated in FIG. 16.

Figure 16:
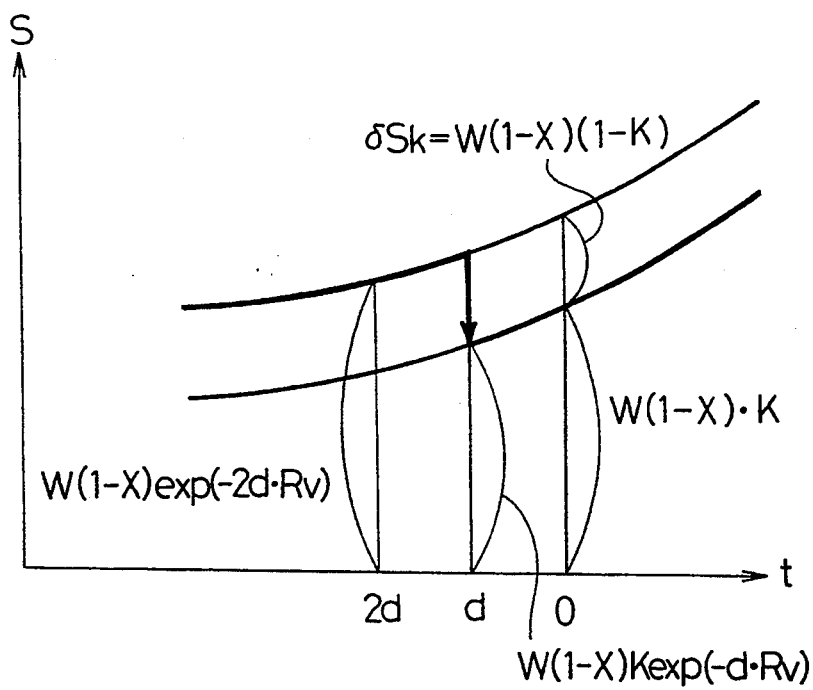
FIG. 16 is a graph representing the situation where there is a bit rate decrease in Variable Bit Rate (VBR) service when the total bit rate is predicted to reach the upper limit for throughput.

As is shown in FIG. 16, the decrease $\delta Sk$ in packet transfer rate is:

$$\delta Sk = WX(1-x)(1-K)$$

which absorbs the respective rate increases $\delta Sc$ and $\delta Sv$ in the CBR and VBR services after time 2d. In other words, we may put:

$$\delta Sk \geq \delta Sc + \delta Sv$$

From the above, if the factor K for the packet transfer rate decrease is made to satisfy:

$$O < K \leq \exp(-2d \cdot Rv) - (1-\exp(-2d \cdot Rc))X/(1-X)$$

the total bit rate at t=0 will not reach the maximum permissible throughput W. Note that if the bit rate acceleration ratios of both the VBR and CBR services are small (1>>2d·Rv>0 and 1>>2d·Rc>O), the following approximation is obtained:

$$O < K \leq 1 - 2d \cdot Rv - 2d \cdot Rc \; X/(1-X)$$

which shows that the ratio of the CBR service is increased by a factor of $X(1-X)$ relative to the VBR service. Accordingly, by reducing the acceleration ratio of the CBR service, the amount of the decrease in the maximum permissible throughout to a level where no transmitted packets are discarded can be made smaller.

In addition the maximum bit rate after time 2d can be predicted at time t=−2d at intermediate node 20 using (current bit rate) · (acceleration ratio of CBR or VBR, whichever is the larger).

The foregoing explanation has illustrated a case where the rate increase ratio (i.e. the acceleration ratio) is fixed but a similar explanation can be given if it as- sumed that it is the rate increase (i.e. the acceleration) that is fixed (Rc at CBR terminals and Rv at VBR terminals). For example let the rate increase of Nc fixed rate terminal nodes at time 2d be 2d·Rc·Nc; the rate increase of vc variable rate terminal nodes at time 2d be 2d·Rv·Nc; and the decrease in packet transfer rate at the variable rate terminal nodes when congestion is prediction be L. In this case, if it is ensured that the following relation is satisfied:

$$L \geq 2d \cdot Rc \cdot Nc/Nv + 2d \cdot Rv$$

increase in the packet transfer rate can be suppressed. In addition the maximum bit rate after time 2d can be predicted at t=−2d at intermediate node 20 using (current bit rate)+(rate increase of CBR or VBR, whichever is the larger)·2d·(Nc+Nv).

Although in the embodiment described above an explanation was given of a packet integrated network congestion avoidance method which provided both Constant Bit Rate service and Variable Bit Rate service, a service in which no packets are discarded is possible using a Variable Bit Rate service only. Furthermore, packets containing rate increase request indications are discarded within the network or the indication that they contain is deleted. Thus, unlike the method that has been explained in the foregoing embodiment wherein congestion is avoided by communicating congestion prediction signals to the terminal nodes, in the embodiment now being considered, congestion avoidance can be achieved without causing any increase in network traffic.

Again in this embodiment, the fixed rate terminal nodes and variable rate terminal nodes were assumed to be separate nodes but they may also be a single node; the use of which involves switching. For example, application of this embodiment is possible in a case where nodes are fixed rate terminal nodes up to a given packet transfer rate, while above this rate they become variable rate terminal nodes. Below a given packet transfer rate operations on packets containing rate increase request indications are ignored, and packets are transmitted at packet transfer rates that have a rate increase (i.e., acceleration) or a rate increase ratio (i.e., acceleration ratio) that is less than a prescribed value. On the other hand, at higher packet transfer rates, the terminal nodes may operate as variable rate terminal nodes.

In this embodiment, the rate decreasing operation of the variable rate terminal nodes was an example of where the packet transfer rates of the variable rate terminal nodes did not become equitable. However, the method disclosed in the foregoing embodiment makes it possible to ensure equitable network use of all variable rate terminal nodes. Packet length may be either fixed or variable. To carry out accurate congestion prediction at intermediate node 20, it is preferable to have fixed length packets. But even with variable length packets, congestion prediction is possible if the maximum packet length is used (when packet length distribution is known, this can be the packet length at a given estimation error).

Embodiment of Packet Transfer Rate Prediction

An explanation will be given of the congestion prediction performed by the congestion prediction circuit 25 in intermediate nodes or packet receiving terminal nodes. As was explained in the foregoing embodiments, in this invention, a future packet transfer rate is predicted in congestion prediction circuit 25 on the basis of a pre-established upper limit for the packet transfer acceleration or acceleration ratio. When it is predicted that the packet transfer rate will exceed a permissible value, a congestion prediction signal is output or a rate increase request indication is deleted.

Figure 17:
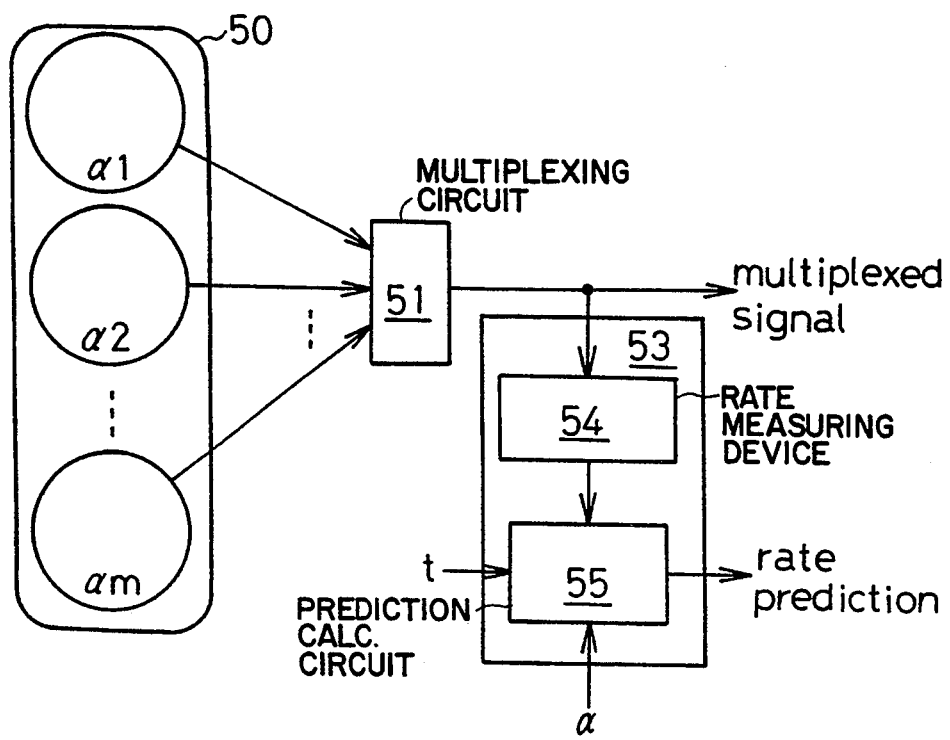
FIG. 17 is a block diagram showing the configuration of a packet rate predictor according to the present invention.

FIG. 17 shows the configuration of an embodiment containing the packet rate predictor of a congestion prediction circuit.

A packet rate predictor 53 according to the present invention includes (a) a rate measuring device 54 which measures the packet transfer rate after packets transmitted from multiple signal source 50 (which corresponds to packet transmitting terminal nodes) have been multiplexed by multiplexing circuit 51, and (b) rate prediction calculating circuit 55 which predicts the packet transfer rate after time t from the upper limit for acceleration $\alpha$, the current packet transfer rate and the prediction time t.

First, the destination address, or channel path or identifier, of each signal source of signal source 50, which is the subject of the measurements, has an upper limit stipulated for the rate of change in the packet rate with respect to time (i.e., for acceleration $\alpha$). Signals from the signal sources are multiplexed by multiplexing circuit 51, and a multiplexed signal is output. Rate measuring device 54 inputs the multiplexed signal. In rate measuring device 54, the current packet transfer rate V can be measured from the total number of bits P (bit) in all packets per time T (sec) of the current packet flow, viz:

$$V = P/T \text{(bit/sec)}$$

Alternatively, the packet transfer rate may also be measured by measuring packet intervals. The measured packet transfer rate is input to rate prediction calculating circuit 55. The rate of change with respect to time in the rate of each signal source 50 ($\alpha_i$) and the prediction time t are also input to rate prediction calculating circuit 55. On the basis of these three inputs, the rate prediction calculating circuit 55 predicts the packet transfer rate after time t and outputs this as a rate prediction.

Because the rise in the packet transfer rate of each signal source 50 after time t is restricted to less than $\alpha \cdot t$, it will not exceed the current packet transfer rate by more than $\alpha \cdot t$. For this reason, letting the limits for the acceleration of signal sources 50 be $\alpha_1 \sim \alpha_m$, the maximum rise in the packet transfer rate is:

$$\sum_{i=1}^{m} \alpha_i \cdot t$$

Adding this value to the total current packet transfer rate $V_\Sigma$ gives V(t), the predicted value for the maximum rate after time t:

$$V(t) = V_\Sigma + \sum_{i=1}^{m} \alpha_i \cdot t$$

thereby completing the calculation for the packet transfer rate prediction. Congestion after time t can then be predicted by comparing this predicted value for maximum rate after time t (V(t)) with the maximum permissible rate $V_{max}$.

Thus, in the present invention, by restricting the maximum acceleration of each signal source 50, it can be guaranteed that the maximum predicted rate is not exceeded. Because this is not a conventional prediction based on probability, but can be decided deterministically, congestion can be avoided with certainty.

No problem is encountered with the maximum rate prediction by means of this method when the number m of signal sources 50 is small. However, the number of signal sources m increases, the average rate increase is large even though acceleration is small. As a result, if the delay involved in congestion control—in particular, the time taken for control signals to reach the signal source, and the delay time d in the foregoing embodiments—becomes large, then the time required for rate prediction will increase. There will then be a danger that, even if the current rate $V_{now}$ is 0, the packet transfer rate will have reached its maximum, which is equal to the node processing speed or the transmission line rate, by prediction time t. This danger is attributable to the fact that rate prediction by this method is dependent on the number of signal sources.

Figure 18:
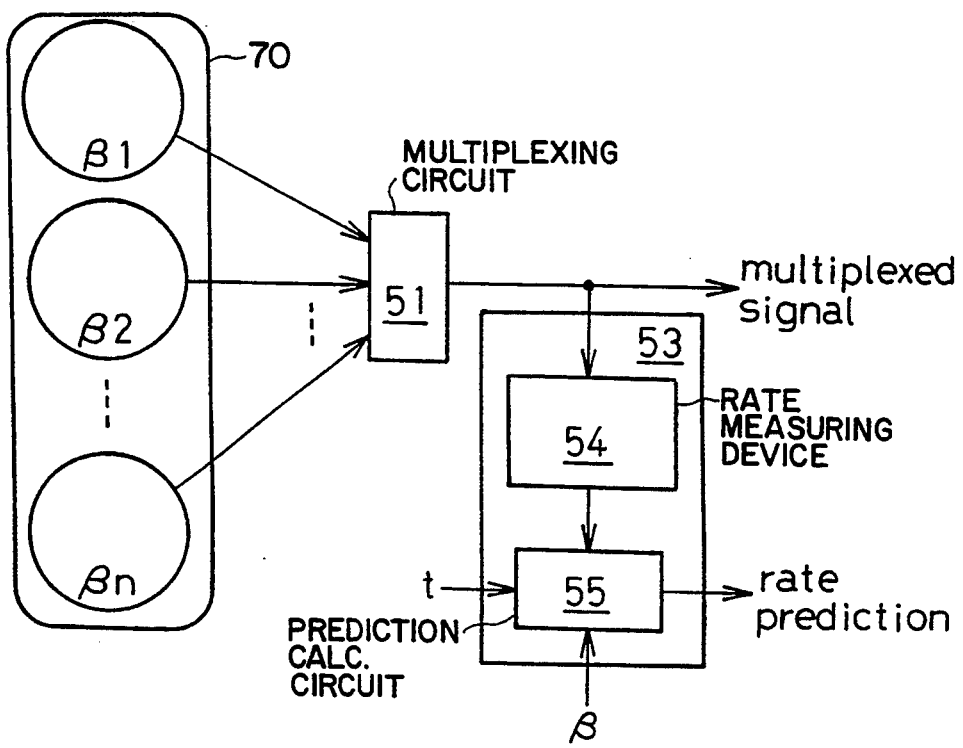
FIG. 18 is a block diagram showing another configuration for a packet rate predictor according to the present invention.

Next, an explanation will be given with reference to FIG. 18 of a rate prediction method that is not dependent on the number of signal sources. FIG. 18 shows the configuration of the packet transfer rate predictor using the ratio of change in rate with another respect to time (i.e., the acceleration ratio of $e^\beta$).

Multiplexing circuit 51 multiplexes a plurality of signals from signal sources 70, and produces a multiplexed output signal which is input to rate predictor 53. Rate predictor 53 has group-specific rate measuring device 56 and rate prediction calculating circuit 55. Rate prediction calculating circuit 55 predicts the packet transfer rate after time t from (a) the current packet transfer rates for each group as measured by group-specific rate measuring device 56, (b) the ratio of change with respect to time in the packet transfer rate that is input (i.e., the acceleration ratio of $e^\beta$), and (c) the prediction time t that is input.

Group-specific rate measuring device 56 divides the input into n groups, discriminating by means of destination address, path identifier or channel, and measures the current packet transfer rates $V_{G1} \sim V_{Gn}$ for packet flow groups $G_1 \sim G_n$. These current packet transfer rates for the various groups are then output to rate prediction calculating circuit 55. The measurement of each of these packet transfer rates is the same as the rate measurement described in connection with FIG. 17.

Rate prediction calculating circuit 55 performs calculations for predicting the packet transfer rate after time t from the ratio of change with respect to time in the packet transfer rates for each signal source 50 (acceleration ratio $e^\beta$) and the a prediction time t. If the lower limit for the packet transfer rate of each signal source is not 0 and the ratio of rise in the packet t transfer rate after time t is restricted to less than $\exp(\beta)$ per unit time, then, because it must not exceed the current rate by more than a factor of $\exp(\beta t)$, the upper limit for the maximum rise in the transfer rate is determined. The predicted value for the maximum packet transfer rate V(t) of the packet flow after t can therefore be obtained for each packet flow group $G_1 \sim G_n$ (signal source 50 being divided into n groups) from (a) the maximum acceleration ratio coefficients $\beta_i$ (i=1~n) in these groups, and (b) the current packet transfer rates $G_l \sim G_n$ of the groups, by means of the following equations:

$$V(t) = \sum_{i=1}^{n} (V_{Gi} \cdot \exp(\beta_i \cdot t))$$

In order to reduce the prediction error, when grouping the packet flow into n groups it is desirable to divide the groups into levels according to the size of the acceleration ratio $\exp(\beta)$. Then it is possible to guarantee that the acceleration ratio in a group is not exceeded, by standardizing the acceleration ratio coefficients $\delta$ in a group using the largest acceleration ratio coefficient $\beta$ in the group.

Unlike the method discussed with respect to FIG. 17, the packet transfer rate prediction method discussed with respect to FIG. 18 is suitable for prediction when there are a large number of signal sources because the prediction is not dependent upon the number of signal sources. In addition, by setting certain $\beta_i$ as $\beta_i = 0$, transfer rate prediction is possible even when constant bit rate signals are a present. Therefore, this method is also applicable to rate prediction in packet integrated networks were both variable bit rate signal sources and constant bit rate signal sources are present.

Packet transfer rate prediction according to FIG. 18 is valid when each signal source 50 generates signals without interruption (i.e., when the lower limit of the signal sources is not 0). However, if signal sources $j(j=1 \sim s$, where s is the total number of these signal sources), are able to halt their generation of signals (i.e., their lower limit is 0), and these signal sources start to generate signals at time $T_O$, which is within the prediction time t, then taking $VI_j$ as the initial rate for each source, the resulting rate increase has an upper limit rate given by:

$$VI_j \exp(\beta_j(t-T_O))$$

If it is assumed that this point in time at which signal generation begins is random for all the signal sources, prediction will be impossible. Therefore when initial rate $VI_j$ is very small, it can be left out from the rate prediction calculation. However, when it cannot be ignored, the total of all the initial rates is added to the rate prediction calculation to give the upper limit V(t) of the maximum rate prediction, as given by the following equation:

$$V(t) = \sum_{i=1}^{n} (V_{Gi} \cdot \exp(\beta_i \cdot t) + \sum_{j=1}^{s} VI_j$$

Thus, because the prediction of the packet transfer rate in the embodiments of this invention can predict the maximum packet transfer rate after time t, it can accurately predict future congestion before it occurs and can, therefore, be used to avoid congestion prior to its occurrence.

Embodiment of Packet Transfer Control

Figures 19, 20:
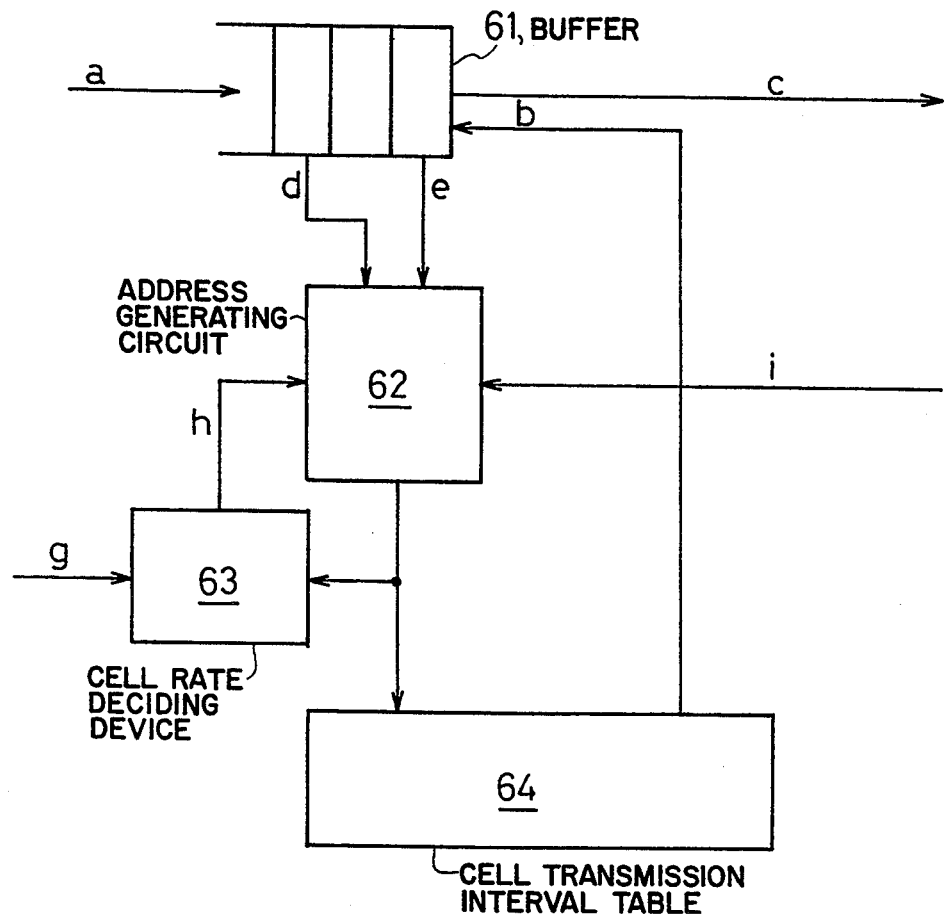
FIG. 19 is a block diagram showing the configuration of a packet transfer control circuit according to the present invention.
FIG. 20 shows the contents of a table of packet transmission intervals according to the present invention.

Next, the packet transfer control performed by packet transmitting terminal nodes 3 will be described. FIG. 19 is a block diagram showing the configuration of the packet transfer control circuit of a packet terminal node, and corresponds to packet flow control circuit 35 of the packet transmitting terminal node depicted in FIG. 5 or FIG. 12. Note that the packets in this embodiment are called cells, which are fixed length packets.

In FIG. 19, cell buffer 61 temporarily stores an input cell a and forwards a stored cell as output cell c. Cell buffer 61 outputs output cell c in response to a TRANSMIT CELL command of cell transmit/do not transmit signal b. Cell buffer 61 outputs cell storage signal d when the stored cells have reached a prescribed number, and outputs an EMPTY signal e when there are no longer any cells to be forwarded.

Address generating circuit 62 is a circuit which increases an output address value by 1 every cell cycle. When cell storage signal d is given, address generating circuit 62 gives a read address f to cell transmission interval table 64; the read address f having been increased consecutively from an initial value of 1.

In cell transmission interval table 64 there is written, corresponding to each address, bit information showing whether or not a cell is to be transmitted. The bit information corresponding to a read address f is output as cell transmit/do not transmit signal b. The interval between bits indicating that a cell is to be transmitted, corresponds to the cell transmission interval. The bit information indicating whether or not a cell is to be transmitted is arranged so that the transmission interval decreases exponentially. An example of such a table is shown in FIG. 20. $1 \sim N$ are addresses corresponding to elapsed time after each successive cell period. At each address there is written either bit information "1" which indicates that a cell is to be transmitted at that elapsed time, or bit information "0" indicating that a cell is not to be transmitted at that elapsed time. Cell transmit/do not transmit signal b therefore has either a "1" or "0" value, and specifies whether or not a cell is to be transmitted at the elapse time corresponding to the address in question. As is shown in FIG. 20, the intervals between successive "1"s (corresponding to the cell transmission interval) continues getting shorter, exponentially.

Cell rate deciding device 63, utilizing the fact that there is a correspondence between read address f and the cell transmission interval (i.e., the cell rate), decides whether or not the cell rate has exceeded a stipulated value by comparing the read address f with a stipulated address g. If it is decided that the cell rate has exceeded the stipulated value, a decision signal h is given to address generating circuit 62. Address generating circuit 62 also receives congestion prediction signals i from the network when congestion is predicted.

When cells are stored in cell buffer 61 and a cell storage signal d is given to address generating circuit 62, and address generating circuit 62 outputs a read address f which it has been incrementing. Cell transmission interval table 64 successively outputs to cell buffer 61 cell transmit/do not transmit signals b that correspond to this read address f. By this means, output cells c are forwarded from cell buffer 61 at the interval corresponding to the bit information indicating that a cell is to be transmitted.

Furthermore, if the cell rate corresponding to the cell transmission interval exceeds a stipulated peak rate, cell rate deciding device 63 outputs decision signal h to address generating circuit 62. Address generating circuit 62 then returns read address f to an address value corresponding to the stipulated cell rate, and repeats anew the processing whereby the address value is incremented by 1. This enables a constant cell rate (CBR: constant bit rate) to be maintained. Now suppose that, in the cell transmission interval table 64 shown in FIG.

20, address N has been made the address corresponding to the peak rate, and that the return address in this case in N-5. Because the bit information at address N-5 is a "1" the peak rate will increase In this case, therefore, when the read address f was returned, it would have been better to have used an address where there was less difference between the average cell rate and the peak rate; for example, to have made N-4 the return address.

Furthermore, if a congestion prediction signal i is input to address generating circuit 62 from the network, the read address f is decreased from the address value it has at that point in time by a prescribed number or a prescribed ratio. Address generating circuit 62 then starts incrementing the address value by 1 all over again. This enables rapid decrease of the cell rate and prevents congestion. Note that when a congestion prediction signal i has been input and the read address f is reduced by a prescribed ratio, equitable use by all packet terminal nodes using the network can be guaranteed. Moreover, when the read address f is returned to an address value that has been decreased by a prescribed number, priority of use can be given to packet terminal nodes that have been forwarding cells from the outset.

When cell buffer 61 receives a cell transmit/do not transmit signal b instructing the transmission of a cell and cell buffer 61 no longer stores a cell for transmission, cell buffer 61 outputs EMPTY signal e to address generating circuit 62. The duration from the last cell transmission until the storage of a new cell is measured. The address generating circuit 62 is then sets the address value to correspond to the measured duration.

Next, construction of cell transmission interval table 64 will be described. Suppose, for example, that elapsed time from the start of cell transmission in the transmission lines is t (sec); the transmission rate of V (bit/see) has an associated constant (i.e., acceleration) A; and the acceleration ratio coefficient is $\beta$(1/sec). In this case, the cell transfer rate will increase in accordance with the exponential function A·exp($\beta$·t) (bit/sec). Defining the current cell transmission interval as $P_i$ (an integer), the elapsed time at the start of cell transmission at this interval as $t_i$, the cell transmission interval error as $E_i$ ($|E_i|<1$), and the duration of a single cell as $T_O$, the next cell transmission interval $P_{i+1}$ (an integer) can be obtained by rounding down, rounding up or rounding off after the decimal point of:

$$V|(A \cdot \exp(\beta \cdot (t_i + P_i \cdot T_O))) + E_i$$

In addition, the packet transmission interval error $E_{i+1}$ at this time is given by:

$$V|(A \cdot \exp(\beta \cdot (t_i + P_i \cdot T_O))) + E_i - P_{i+1}$$

Cell transmission interval table 64 can be constructed by obtaining successive cell transmission intervals in this way. As to the calculation of cell transmission intervals, it may be noted that a smooth exponential rise in the average cell transfer rate with respect to time can be obtained, for high cell transfer rates in particular, by error correction. The error correction is achieved by adding the previous cell transmission interval error.

Figure 21:
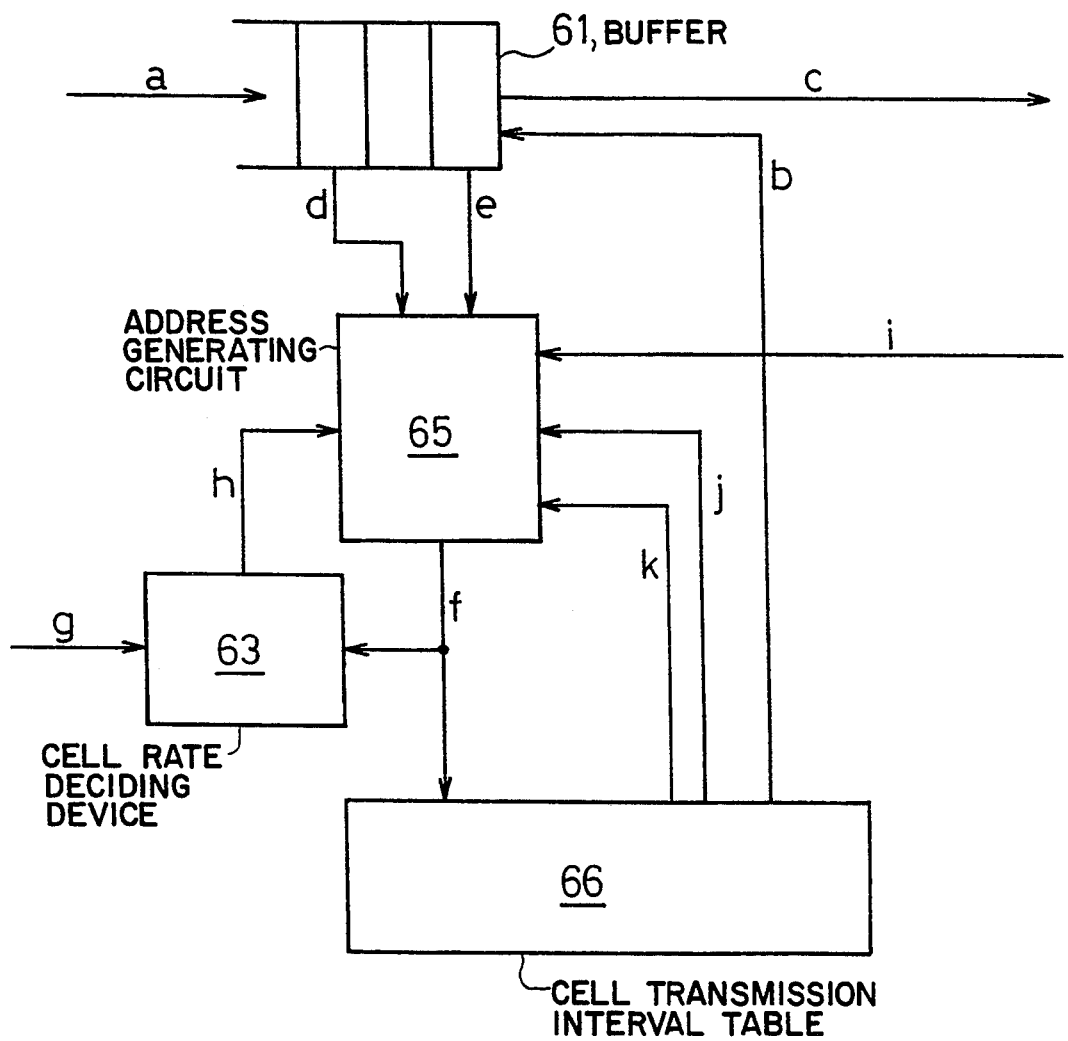

FIG. 21 shows the configuration of another embodiment of the cell transmission control circuit. The configuration depicted in this figure is the same as that of the embodiment shown in FIG. 19, apart from address generating circuit 65 and cell transmission interval table 66. When read address f has been generated from address generating circuit 65, cell transmission interval table 66 sends cell transmit/do not transmit signal b corresponding to this read address f to cell buffer 61. At the same time, cell transmission interval table 66 sends return addresses j and k to address generating circuit 65. Return address j is a return address that corresponds to a stipulated cell rate, and return address k is a multiplication or subtraction type return address.

An example of the constitution of cell transmission interval table 66 is given in FIG. 22. 1~N are addresses corresponding to elapse time after each successive cell period. At each address there is written either bit information "1" which indicates that a cell is to be transmitted at that elapse time, or bit information "0" indicating that a cell is not to be transmitted at that elapse time. Also written in cell transmission interval table 66, and corresponding to each address, are multiplication or substraction type return addresses $k_1 \sim k_N$ and return addressed $j_1 \sim j_N$ corresponding to a stipulated cell rate. The method whereby this cell transmission interval table 66 is constructed is the same as in the case of cell transmission interval table 64 described above. However, multiplication type return addresses $k_1 \sim k_N$ are obtained by rounding down, rounding up or rounding off after the decimal point, the value obtained by multiplying the address value by a prescribed value K(K<1).

As described above, when making equitable use of the network, address generating circuit 65 stores a return address k (a multiplication type return address) the value of which is lower than that of the address at the current point in time by a prescribed ratio. If a congestion prediction signal i is input at this point in time, read address f is returned to this return address k and address incrementing is resumed. On the other hand, when use of the network is to be based on priority, address generating circuit 65 stores a return address k (a subtraction type return address) the value of which is lower than that of the address at the current point in time by a prescribed number. If a congestion prediction signal i is input at this point in time, read address f is returned to read address k and address incrementing is resumed.

Address generating circuit 65 also stores return address j corresponding to a stipulated cell rate. When the cell transfer rate exceeds the stipulated value, read address f is returned to this read address j in response to decision signal h output from cell rate deciding device 63. Then address incrementing is resumed. It may be noted that this return address j is likewise set to an address value where the difference between the average cell transfer rate and the peak transfer rate is small.

Thus, by having all the return addresses written into cell transmission interval table 66, address generating circuit 65 can use the given return addresses as is without any computation being required. Consequently, although the memory capacity of cell transmission interval table 66 increases, it is no longer necessary to have multipliers and subtracters in address generating circuit 65; thus, facilitating high speed operation.

In the configuration shown in the embodiment disclosed above, when a congestion prediction signal i is input, read address f is returned directly to an address that has been decreased either by a prescribed number or a prescribed ratio. However, the cell transfer rate may also be decreased by reducing read address f at this point in time by 1 at each cell period, and decrementing read address f to an address that has been decreased by a prescribed number or a prescribed ratio. In this case, address incrementing is resumed after read address f has decreased to the target address.

Moreover, if the configuration adopted in the embodiment disclosed above is the one wherein read address f is returned to an address that has been decreased by a prescribed ratio when a congestion prediction signal i has been input, then, because the return address can take on all sorts of values according to the cell transmission interval (i.e., because the return time position becomes random) the probability of cells transmitted from a plurality of packet terminal nodes arriving simultaneously at a congested intermediate node can be reduced.

Also, although in the embodiments shown in FIGS. 19 and 20 the increase in the transfer rate is an acceleration ratio $\exp(\beta)$, a cell transmission control circuit can be similarly constituted using a cell transmission interval table based on acceleration $\alpha$.

Effects of the Invention

In a packet network according to this invention, in order to detect that congestion will occur in the future, the packet transfer rate at a prescribed time in the future is predicted deterministically and accurately on the basis of the current packet transfer rate and the concepts of acceleration or acceleration ratio as values indicating the increase in the packet transfer rate. As a result, congestion within the network can be predicted, and effective packet transmission control can be carried out on the basis of this prediction. For this reason, this invention is effective in that:

1) packets are not discarded in the packet network;
2) high throughput network operation is possible;
3) buffer memory capacity of nodes can be decreased;
4) there are no restrictions on network topology;
5) an integrated network with both variable bit rate and constant bit rate transmission is possible;
6) above the transfer rate stipulated for CBR transmitting nodes, a node can operate as a VBR transmitting node;
7) it is applicable to 1:1 and N:M transmission;
8) to signal congestion, the generation of new packets within the network can be avoided.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A packet transfer network comprising:
   at least one receiving nodal portion means for receiving packets; and
   at least one transmitting nodal portion means for transferring packets to at least one receiving nodal portion means, the transmitting nodal portion means for transferring packets at a packet transfer rate less than or equal to a rate limit, and the transmitting nodal portion means including packet flow control means for increasing the packet transfer rate at a rate less than or equal to a packet acceleration limit.

2. A packet transfer network comprising:
   at least one receiving nodal portion means for receiving packets; and
   at least one transmitting nodal portion means for transferring packets to at least one receiving nodal portion means, the transmitting nodal portion means for transferring packets at a packet transfer rate less than or equal to a rate limit, and the transmitting nodal portion means including packet flow control means for increasing the packet transfer rate at a rate less than or equal to a packet acceleration ratio.

3. A packet transfer network comprising:
   at least one receiving nodal portion means for receiving packets; and
   at least one transmitting nodal portion means for transferring packets to at least one receiving nodal portion means, the transmitting nodal portion means for transferring packets at a packet transfer rate less than or equal to a rate limit, the transmitting nodal portion means for transferring packets at an initial rate, and the transmitting nodal portion means including packet flow control means for increasing the packet transfer rate at a rate less than or equal to a rate increase limit.

4. A packet transfer network comprising:
   at least one receiving nodal portion means for receiving packets; and
   at least one transmitting nodal portion means for transferring packets to at least one receiving nodal portion means, the transmitting nodal portion means for transferring packets at a packet transfer rate less than or equal to a rate limit, and the transmitting nodal portion means including packet flow control means for increasing the packet transfer rate at a rate less than or equal to a rate increase limit;.
   the receiving nodal portion means including predicting means for predicting the packet transfer rate after a predetermined time based on the rate increase limit and one of the packet transfer rate of transferred packets and the packet transfer rate of packets being received.

5. A packet transfer network according to claim 4, wherein the predicting means predicts future packet congestion based on the predicted packet transfer rate.

6. A packet transfer network according to claim 5 wherein
   the receiving nodal portion means includes notification means for outputting a congestion signal to the transmitting nodal portion means when future packet congestion is predicted; and
   the transmitting nodal portion means includes congestion signal receiving means for receiving a congestion signal from the notification means, and wherein the packet flow control means reduces the packet transfer rate in response to a received congestion signal.

7. A packet transfer network according to claim 6, wherein the packet flow control means reduces the packet transfer rate by a predetermined factor in response to a received congestion signal.

8. A packet transfer network according to claim 5, wherein the predicting means predicts future packet congestion when the predicted packet transfer rate is greater than a predetermined threshold, and the predetermined threshold is less than or equal to the rate limit.

9. The packet network according to claim 6, wherein the transmitting nodal portion means transfers packets upon receipt of a packet transfer signal and suspends transferring packets upon receipt of suspend packet transfer signals; and the packet flow control means includes, cell interval table means for storing the packet transfer signals and the suspend packet transfer signals, the cell interval table means has table addresses corresponding to each stored packet transfer signal and suspend packet transfer signal, a ratio of an amount of stored packet transfer signals in the cell interval table means with respect to an amount of stored suspend packet transfer signals in the cell interval table means increasing with increasing table addresses, address generating means for generating a table address, for causing the cell interval table to output the one of the packet transfer signal and suspend packet transfer signal stored at the generated table address, and for increasing the generated table address, and cell rate deciding means for comparing the packet transfer rate to the rate limit, and for decreasing the generated table address when the packet transfer rate equals or exceeds the rate limit.

10. The packet network according to claim 9, wherein the cell interval table stores return addresses addressable by each table address, each return address is less than or equal to the corresponding table address, and the cell rate deciding means changes the generated table address to the return address corresponding thereto when the packet transfer rate equals or exceeds the rate limit.

11. The packet network according to claim 9, wherein the address generating means decreases the generated address when the packet congestion signal is received.

12. A packet network comprising:

at least one receiving nodal portion means for receiving packets; and at least one transmitting nodal portion means for transferring packets to at least one receiving nodal portion means, the transmitting nodal portion means for transferring packets at a packet transfer rate less than or equal to a rate limit, and the transmitting nodal portion means including packet flow control means for increasing the packet transfer rate at a rate less than or equal to a rate increase limit, the packet flow control means including:

cell interval table means for storing packet transfer signals and suspend packet transfer signals, the cell interval table means having table addresses corresponding to each stored packet transfer signal and suspend packet transfer signal, a ratio of an amount of stored packet transfer signals in the cell interval table means with respect to an amount of stored suspend packet transfer signals in the cell interval table means increasing with increasing table addresses, address generating means for generating a table address, for causing the cell interval table to output the one of the packet transfer signal and suspend packet transfer signal stored at the generated table address, and for increasing the generated table address, and cell rate deciding means for comparing the packet transfer rate to the rate limit, and for decreasing the generated table address when the packet transfer rate equals or exceeds the rate limit;

wherein the transmitting nodal portion means transfers packets upon receipt of a packet transfer signal and suspends transferring packets upon receipt of suspend packet transfer signals.

13. The packet network according to claim 12, wherein the cell rate deciding means decreases the generated table address by a predetermined number.

14. The packet network according to claim 12, wherein the cell interval table stores return addresses addressable by each table address, each return address is less than or equal to the corresponding table address, and the cell rate deciding means changes the generated table address to the return address corresponding thereto when the packet transfer rate equals or exceeds the rate limit.

15. A packet transfer network comprising:

a plurality of transmitting nodal portion means for transferring packets, each transmitting nodal portion means for transferring packets at a packet transfer rate less than or equal to a corresponding rate limit, and each transmitting nodal portion means including packet flow control means for increasing the packet transfer rate at a rate less than or equal to a corresponding packet acceleration limit; and at least one receiving nodal portion means for receiving packets from at least one transmitting nodal portion means, the receiving nodal portion means including, rate measuring means for measuring the packet transfer rate of packets received from each transmitting nodal portion means, and predicting means for predicting a maximum packet transfer rate after a predetermined time based on the packet acceleration limit corresponding to each transmitting nodal portion means and the measured packet transfer rates.

16. The packet flow network according to claim 15, wherein the predicting means predicts the maximum packet transfer rate after the predetermined period of time according to the following equation $$V(t) = V_\Sigma + \sum_{i=1}^{m} a_i \cdot t$$

where $a_i$ ($i=1 \sim m$) is the packet acceleration limit for each of m transmitting nodal portions means and $V_\Sigma$ is the total measured packet transfer rate.

17. The packet flow network according to claim 15, wherein the predicting means predicts future packet congestion based on the predicted maximum packet transfer rate.

18. The packet transfer network according to claim 17, wherein the receiving nodal portion means includes notification means for outputting a congestion signal to the transmitting nodal portion means when future packet congestion is predicted; and each transmitting nodal portion means includes congestion signal receiving means for receiving a congestion signal from the notification means, and wherein the packet flow control means reduces the packet transfer rate in response to a received congestion signal.

19. A congestion prediction device for a packet network, the packet network including at least one transmitting nodal portion means for transmitting packets at a packet transfer rate less than or equal to a corresponding rate limit, and each transmitting nodal portion means including packet flow control means for increasing the packet transfer rate at a rate less than or equal to a corresponding packet acceleration limit, the congestion prediction device comprising:
receiving means for receiving packets transferred from transmitting nodal portion means;
rate measuring means for measuring a packet transfer rate of packets received from each transmitting nodal portion means; and
predicting means for predicting a maximum packet transfer rate after a predetermined time based on the packet acceleration limits corresponding to each transmitting nodal portion means and the measured packet transfer rates, and for predicting future packet congestion based on the predicted maximum packet transfer rate.

20. The congestion prediction device according to claim 19, wherein the predicting means predicts the maximum packet transfer rate after the predetermined period of time according to the following equation $$V(t) = V_\Sigma + \sum_{i=1}^{m} a_i \cdot t$$

where $a_i$ (i=1~m) is the packet acceleration limit for each of m transmitting nodal portions means and $V_\Sigma$ is the total measured packet transfer rate.

21. A packet transfer network comprising:
a plurality of transmitting nodal portion means for transferring packets to at least one receiving nodal portion means, each transmitting nodal portion means for transferring packets at a packet transfer rate less than or equal to a corresponding rate limit, and each transmitting nodal portion means including packet flow control means for increasing the packet transfer rate at a rate less than or equal to a corresponding packet acceleration ratio limit; and
at least one receiving nodal portion means for receiving packets, the receiving nodal portion means including:
group specific rate measuring means for dividing the packets received from the plurality of transmitting nodal portion means into n groups, and for measuring a group packet transfer rate for each group, and
predicting means for predicting a maximum packet transfer rate after a predetermined time based on the packet acceleration ratio limit corresponding to each transmitting nodal portion means and the measured group packet transfer rate for each group.

22. The packet transfer network according to claim 21, wherein the predicting means predicts the maximum packet transfer rate after the predetermined period of time according to the following equation $$V(t) = \sum_{i=1}^{n} (V_{Gi} \cdot \exp(\beta_i \cdot t))$$

where $\exp(\beta_i)$ (i=1~n) is a maximum acceleration ratio limit within each group out of the packet acceleration ratio limits for nodal transmitting portion means having transferred packets in the group and $V_{Gl}$~$V_{Gn}$ are the measured group packet transfer rates.

23. The packet transfer network according to claim 21, wherein the predicting means predicts the maximum packet transfer rate after the predetermined period of time according to the following equation $$V(t) = \sum_{i=1}^{n} (V_{Gi} \cdot \exp(\beta_i \cdot t)) + \sum_{j=1}^{n} VI_j$$

where $\exp(\beta_i)$ (i=1~n) is a maximum acceleration ratio limit within each group out of the packet acceleration ratio limits for nodal transmitting portion means having transferred packets in the group; $V_{Gl}$~$V_{Gn}$ are the measured group packet transfer rates; and $$\sum_{i=1}^{n} VI_j$$

is a total of all initial packet transfer rates.

24. The packet transfer network according to claim 21, wherein the predicting means predicts future packet congestion based on the predicted maximum packet transfer rate.

25. The packet transfer network of claim 24, wherein
the receiving nodal portion means includes notification means for outputting a congestion signal to the transmitting nodal portion means when future packet congestion is predicted; and
each transmitting nodal portion means includes congestion signal receiving means for receiving a congestion signal from the notification means, and wherein the packet flow control means reduces the packet transfer rate in response to a received congestion signal.

26. A congestion prediction device for a packet network, the packet network including at least one transmitting nodal portion means for transmitting packets at a packet transfer rate less than or equal to a corresponding rate limit, and each transmitting nodal portion means including packet flow control means for increasing the packet transfer rate at a rate less than or equal to a corresponding packet acceleration ratio limit, the congestion prediction device comprising:
receiving means for receiving packets transferred from transmitting nodal portion means;
group specific rate measuring means for dividing the packets received from the transmitting nodal portion means into n groups, and for measuring a packet transfer rate for each group; and
predicting means for predicting a maximum packet transfer rate after a predetermined time based on the packet acceleration ratio limits corresponding to each transmitting nodal portion means and the measured group packet transfer rates, and for predicting future packet congestion based on the predicted maximum packet transfer rate.

27. The congestion prediction device according to claim 26, wherein the predicting means predicts the maximum packet transfer rate after the predetermined period of time according to the following equation $$V(t) = \sum_{i=1}^{n} (V_{Gi} \cdot \exp(\beta_i \cdot t))$$

where $\exp(\beta_i)$ ($i=1\sim n$) is a maximum acceleration ratio limit within each group out of the packet acceleration ratio limits for nodal transmitting portion means having transferred packets in the group and $V_{G1}\sim V_{Gn}$ are the measured group packet transfer rates.

28. The congestion prediction device according to claim 26, wherein the predicting means predicts the maximum packet transfer rate after the predetermined period of time according to the following equation $$V(t) = \sum_{i=1}^{n} (V_{Gi} \cdot \exp(\beta_i \cdot t) + \sum_{j=1}^{n} VI_j$$

where $\exp(\beta_i)$ ($i=1\sim n$) is a maximum acceleration ratio limit within each group out of the packet acceleration ratio limits for nodal transmitting portion means having transferred packets in the group; $V_{G1}\sim V_{Gn}$ are the measured group packet transfer rates; and $$\sum_{i=1}^{n} VI_j$$

is a total of all initial packet transfer rates.

29. A packet network, comprising:
at least one first nodal portion means for transferring packets and receiving packets, the first nodal portion means including:
measuring means for measuring a packet receiving capacity, for packets being received, of the first nodal portion means,
increase request means for adding increase requests to packets being transferred from the first nodal portion means when the measured capacity is below a predetermined value,
request detecting means for detecting whether packets being received include increase requests, and
flow control means for controlling a packet transfer rate of the first nodal portion means, the flow control means increasing the packet transfer rate when increase requests are detected and decreasing the packet transfer rate when increase requests are not detected; and
at least one second nodal portion means for receiving packets from at least one of a first nodal portion means and a second nodal portion means, and for transferring packets to at least one of a first nodal portion means and a second nodal portion means.

30. The packet network according to claim 29, wherein the measuring means suspends operation of the increase request means when the packet receiving capacity is greater than or equal to the predetermined value.

31. The packet network according to claim 29, wherein
the flow control means increases the packet transfer rate according to an increase acceleration limit; and
the second nodal portion means includes,
congestion prediction means for predicting packet congestion based on the increase acceleration limit of each first nodal portion means from which packets have been received, and
deleting means for deleting increase requests from received packets when packet congestion is predicted by the congestion prediction means.

32. The packet network according to claim 29, wherein
the flow control means increases the packet transfer rate according to an increase acceleration ratio limit; and
the second nodal portion means includes,
congestion prediction means for predicting packet congestion based on the increase acceleration ratio limit of each first nodal portion means from which packets have been received, and
deleting means for deleting increase requests from received packets when packet congestion is predicted by the congestion prediction means.

33. A method of controlling packet transfer in a packet network comprising the steps of:
transferring packets from at least one transmitting nodal portion means to at least one receiving nodal portion means, wherein the packets are transferred at a packet transfer rate less than or equal to a rate limit; and
increasing the packet transfer rate at a rate less than or equal to a rate increase limit.

34. The method according to claim 33, wherein in the increasing step the rate increase limit is a packet acceleration limit.

35. The method according to claim 33, wherein in the increasing step the rate increase limit is a packet acceleration ratio.

36. The method according to claim 33, further comprising the step of transferring packets at an initial rate.

37. The method according to claim 33, further comprising the step of first predicting the packet transfer rate after a predetermined time based on the rate increase limit and one of the packet transfer rate of transferred packets and the packet transfer rate of packets being received by the receiving nodal portion means.

38. The method according to claim 37, further comprising the step of second predicting future packet congestion at the receiving nodal portion means based on the predicted packet transfer rate.

39. The method according to claim 38, further comprising the steps of:
outputting a congestion signal to the transmitting nodal portion means when future packet congestion is predicted; and
reducing the packet transfer rate in response to a received congestion signal.

40. The method according to claim 39, wherein in the reducing step the packet transfer rate is reduced by a predetermined factor in response to a received congestion signal.

41. The method according to claim 38, wherein in the second predicting step, future packet congestion is predicted when the predicted packet transfer rate is greater than a predetermined threshold, the predetermined threshold is less than or equal to the rate limit.

42. The method according to claim 33, further comprising the steps of:
storing packet transfer signals and suspend transfer signals at table addresses of a cell interval table, a number of the packet transfer signals increasing as the table addresses increase with respect to the suspend transfer signals;
generating a table address;
transferring a packet when a packet transfer signal is output from the cell interval table in response to the table address;

suspending transfer of packets when a suspend transfer signal is output from the cell interval table in response to the generated table address; and incrementing the generated table address.

43. The method according to claim 42, further comprising the steps of:

deciding means for generating a deciding signal when the packet transfer rate exceeds the rate limit; and decreasing the generated address in response to the deciding signal.

44. The method according to claim 43, further comprising the step of:

storing return addresses in the cell interval table, each return address corresponding to and being less than or equal to a table address; and wherein the decreasing means decreases the generated address to the corresponding return address in response to the deciding signal.

45. A method of controlling packet transfer in a packet network comprising the steps of:

transferring packets from a plurality of transmitting nodal portion means to at least one receiving nodal portion means, wherein the packets of each transmitting nodal portion means are transferred at a packet transfer rate less than or equal to a corresponding rate limit;

increasing the packet transfer rate of each transmitting nodal portion means at a rate less than or equal to a corresponding packet acceleration limit;

measuring the packet transfer rate of packets received from each transmitting nodal portion means by the receiving nodal portion means; and first predicting a maximum packet transfer rate after a predetermined time based on the packet acceleration limit corresponding to each transmitting nodal portion means and the measured packet transfer rates.

46. The method according to claim 45, wherein the first predicting step predicts the maximum packet transfer rate after the predetermined period of time according to the following equation $$V(t) = V_\Sigma + \sum_{i=1}^{m} a_i \cdot t$$

where $a_i$ (i=1~m) is the packet acceleration limit for each of m transmitting nodal portions means and $V_\Sigma$ is a total measured packet transfer rate.

47. The method according to claim 45, further comprising the step of second predicting a future packet congestion at the receiving nodal portion means based on the predicted maximum packet transfer rate.

48. The method according to claim 47, further comprising the step of reducing the packet transfer rate when future packet congestion is predicted.

49. A congestion prediction method for a packet network, the packet network including at least one transmitting nodal portion means for transmitting packets at a packet transfer rate less than or equal to a corresponding rate limit, and each transmitting nodal portion means including packet flow control means for increasing the packet transfer rate at a rate less than or equal to a corresponding packet acceleration limit, the congestion prediction method comprising the steps of:

measuring the packet transfer rate of packets received from each transmitting nodal portion means by the receiving nodal portion means;

first predicting a maximum packet transfer rate after a predetermined time based on the packet acceleration limit corresponding to each transmitting nodal portion means and the measured packet transfer rates; and second predicting future packet congestion based on the predicted maximum packet transfer rate.

50. The method according to claim 49, wherein the first predicting step predicts the maximum packet transfer rate after the predetermined period of time according to the following equation $$V(t) = V_\Sigma + \sum_{i=1}^{m} a_i \cdot t$$

where $a_i$ (i=1~m) is the packet acceleration limit for each of m transmitting nodal portions means; and $V_\Sigma$ is a total measured packet transfer rate.

51. A method of controlling packet transfer in a packet network comprising the steps of:

transferring packets to at least one receiving nodal portion means from a plurality of transmitting nodal portion means, wherein each transmitting nodal portion means transfers packets at a packet transfer rate less than or equal to a corresponding rate limit;

increasing the packet transfer rate of each transmitting nodal portion means at a rate less than or equal to a corresponding packet acceleration ratio limit;

dividing the packets received from the plurality of transmitting nodal portion means by the receiving nodal portion means into n groups;

measuring a group packet transfer rate for each group;

first predicting means for predicting a maximum packet transfer rate after a predetermined time based on the packet acceleration ratio limit corresponding to each transmitting nodal portion means and the measured group packet transfer rates.

52. The method according to claim 51, wherein the first predicting step predicts the maximum packet transfer rate after the predetermined period of time according to the following equation $$V(t) = \sum_{i=1}^{n} (V_{Gi} \cdot \exp(\beta_i \cdot t))$$

where $\exp(\beta_i)$ (i=1~n) is a maximum acceleration ratio limit within each group out of the packet acceleration ratio limits for nodal transmitting portion means having transferred packets in the group; and $V_{Gl}$~$V_{Gn}$ are the measured group packet transfer rates.

53. The method according to claim 51, wherein the first predicting step predicts the maximum packet transfer rate after the predetermined period of time according to the following equation $$V(t) = \sum_{i=1}^{n} (V_{Gi} \cdot \exp(\beta_i \cdot t)) + \sum_{j=1}^{n} VI_j$$

where $\exp(\beta_i)$ (i=1~n) is a maximum acceleration ratio limit within each group out of the packet acceleration ratio limits for nodal transmitting portion means having transferred packets in the group; $V_{Gl}$~$V_{Gn}$ are the measured group packet transfer rates; and $$\sum_{i=1}^{n} VI_j$$

is a total of all initial packet transfer rates.

54. The method according to claim 51, further comprising the step of second predicting future packet congestion based on the predicted packet transfer rate.

55. The method according to claim 54, further comprising the steps of:
reducing the packet transfer rate at each transmitting nodal portion means when future packet congestion is predicted.

56. A method of predicting congestion in a packet network, the packet network including at least one transmitting nodal portion means for transmitting packets at a packet transfer rate less than or equal to a corresponding rate limit, and each transmitting nodal portion means including packet flow control means for increasing the packet transfer rate at a rate less than or equal to a corresponding packet acceleration ratio limit, comprising the steps of:
dividing the packets received from the transmitting nodal portion means by the receiving nodal portion means into n groups;
measuring a group packet transfer rate for each group;
first predicting means for predicting a maximum packet transfer rate after a predetermined time based on the packet acceleration ratio limit corresponding to each transmitting nodal portion means and the measured group packet transfer rates;
second predicting future packet congestion based on the predicted maximum packet transfer rate.

57. The method according to claim 56, wherein the first predicting step predicts the maximum packet transfer rate after the predetermined period of time according to the following equation $$V(t) = \sum_{i=1}^{n} (V_{Gi} \cdot \exp(\beta_i \cdot t))$$

where $\exp(\beta_i)$ ($i=1 \sim n$) is a maximum acceleration ratio limit within each group out of the packet acceleration ratio limits for nodal transmitting portion means having transferred packets in the group; and $V_{GI} \sim V_{Gn}$ are the measured group packet transfer rates.

58. The method according to claim 56, wherein the first predicting step predicts the maximum packet transfer rate after the predetermined period of time according to the following equation $$V(t) = \sum_{i=1}^{n} (V_{Gi} \cdot \exp(\beta_i \cdot t) + \sum_{j=1}^{n} VI_j$$

where $\exp(\beta_i)$ ($i=1 \sim n$) is a maximum acceleration ratio limit within each group out of the packet acceleration ratio limits for nodal transmitting portion means having transferred packets in the group; $V_{GI} \sim V_{Gn}$ are the measured group packet transfer rates; and $$\sum_{i=1}^{n} VI_j$$

is a total of all initial packet transfer rates.

59. A method of controlling packet transfer in a packet network including at least one first nodal portion means for transferring packets and receiving packets, the packet network also including at least one second nodal portion means for receiving packets from at least one of a first nodal portion means and a second nodal portion means, the second nodal portion means also for transferring packets to at least one of a first nodal portion means and a second nodal portion means, the method comprising the steps of:
measuring a packet receiving capacity, of packets being received, of the first nodal portion means;
adding increase requests to packets being transferred from the first nodal portion means when the measured receiving capacity is below a predetermined value;
detecting whether packets being received by the first nodal portion means include increase requests;
increasing the packet transfer rate at the first nodal portion means when increase requests are detected; and
decreasing the packet transfer rate at the first nodal portion means when increase requests are not detected.

60. The method according to claim 59, further comprising the step of suspending the increase step when the capacity is greater than or equal to the predetermined value.

61. The method according to claim 59, wherein
the increasing step increases the packet transfer rate according to an increase acceleration limit; and
the method further includes the steps of,
predicting packet congestion within the second nodal portion means based on the increase acceleration limit of each first nodal portion means from which packets have been received; and
deleting increase requests from packets received by the second nodal portion means when packet congestion is predicted by the congestion prediction means.

62. The method according to claim 59, wherein
the increasing step increases the packet transfer rate according to an increase acceleration ratio limit; and
the method further includes the steps of,
predicting packet congestion within the second nodal portion means based on the increase acceleration ratio limit of each first nodal portion means from which packets have been received, and
deleting increase requests from packets received by the second nodal portion means when packet congestion is predicted by the congestion prediction means.

* * * * *